US012411449B2

(12) United States Patent
Maeda et al.

(10) Patent No.: US 12,411,449 B2
(45) Date of Patent: Sep. 9, 2025

(54) PROCESS UNIT INCLUDING FIRST, SECOND AND THIRD CONVEYANCE MEMBERS FOR CONVEYING DEVELOPER

(71) Applicant: CANON KABUSHIKI KAISHA, Tokyo (JP)

(72) Inventors: Naoki Maeda, Shizuoka (JP); Shunsuke Uratani, Shizuoka (JP); Makoto Hayashida, Shizuoka (JP); Tetsuo Uesugi, Shizuoka (JP); Yuuki Nakamura, Shizuoka (JP); Joji Goto, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/213,383

(22) Filed: Jun. 23, 2023

(65) Prior Publication Data

US 2023/0418209 A1 Dec. 28, 2023

(30) Foreign Application Priority Data

Jun. 24, 2022 (JP) ................................ 2022-102192
Mar. 29, 2023 (JP) ................................ 2023-054270

(51) Int. Cl.
*G03G 21/00* (2006.01)
*G03G 21/10* (2006.01)

(52) U.S. Cl.
CPC ... *G03G 21/105* (2013.01); *G03G 2221/0015* (2013.01); *G03G 2221/1624* (2013.01)

(58) Field of Classification Search
CPC ......... G03G 21/105; G03G 2221/0015; G03G 2215/1624; G03G 2221/1621

(Continued)

(56) References Cited

U.S. PATENT DOCUMENTS 4,974,031 A * 11/1990 Koiso .................... G03G 21/12 222/DIG. 1
5,132,740 A * 7/1992 Okamoto ............... G03G 21/12 141/351

(Continued)

FOREIGN PATENT DOCUMENTS

JP 2012-208167 A 10/2012

OTHER PUBLICATIONS

Co-pending U.S. Appl. No. 18/204,420, filed Jun. 1, 2023.

(Continued)

*Primary Examiner* — Robert B Beatty
(74) *Attorney, Agent, or Firm* — Venable LLP

(57) ABSTRACT

A cartridge including a rotatable image bearing member which bears a developer, a cleaning member for removing a developer remaining on a surface of the image bearing member, the cleaning member having a contact portion in contact with the surface of the image bearing member and a support portion which supports the contact portion, a developer recovering portion which recovers the developer removed by the cleaning member, a first conveyance member which is disposed inside the developer recovering portion and conveys the recovered developer in a rotation axis direction of the image bearing member, a second conveyance member which conveys the developer conveyed by the first conveyance member in a direction crossing the rotation axis direction toward a discharge port provided in the developer recovering portion, and a third conveyance member to convey the developer toward the center of the photosensitive drum in the rotational axis direction. The second conveyance member is disposed at an inner side of the contact portion of the cleaning member with respect to an end part of the contact portion of the cleaning member.

5 Claims, 33 Drawing Sheets

(58) Field of Classification Search
USPC .................................................. 399/120, 359
See application file for complete search history.

(56) References Cited

U.S. PATENT DOCUMENTS

| | | | | |
|---|---|---|---|---|
| 5,526,100 | A * | 6/1996 | Misago ................ | G03G 21/105 399/61 |
| 8,571,445 | B2 | 10/2013 | Komatsu et al. | |
| 10,551,790 | B2 | 2/2020 | Komatsu | |
| 11,061,366 | B2 | 7/2021 | Uesugi et al. | |
| 2005/0100367 | A1 | 5/2005 | Uratani et al. | |
| 2006/0067730 | A1 | 3/2006 | Uratani et al. | |
| 2008/0253800 | A1 | 10/2008 | Uratani et al. | |
| 2008/0292331 | A1 | 11/2008 | Yokomori et al. | |
| 2009/0245851 | A1 | 10/2009 | Hoshi et al. | |
| 2010/0054796 | A1 | 3/2010 | Nakamura et al. | |
| 2010/0054799 | A1 | 3/2010 | Nakamura et al. | |
| 2010/0054804 | A1 | 3/2010 | Uneme et al. | |
| 2011/0002720 | A1* | 1/2011 | Ooyoshi .............. | G03G 21/105 399/359 |
| 2011/0103830 | A1 | 5/2011 | Nakamura et al. | |
| 2011/0170903 | A1 | 7/2011 | Hoshi et al. | |
| 2012/0183328 | A1 | 7/2012 | Nakamura et al. | |
| 2012/0243905 | A1 | 9/2012 | Uratani et al. | |
| 2012/0269540 | A1 | 10/2012 | Kawai et al. | |
| 2012/0315062 | A1 | 12/2012 | Uneme et al. | |
| 2013/0129377 | A1 | 5/2013 | Satomura et al. | |
| 2013/0142541 | A1 | 6/2013 | Hayashida | |
| 2013/0164029 | A1 | 6/2013 | Fukui et al. | |
| 2013/0177334 | A1 | 7/2013 | Nonaka et al. | |
| 2013/0336679 | A1 | 12/2013 | Furutani et al. | |
| 2013/0343785 | A1 | 12/2013 | Matsuzaki et al. | |
| 2014/0029974 | A1 | 1/2014 | Uesugi et al. | |
| 2014/0064776 | A1 | 3/2014 | Yamasaki et al. | |
| 2014/0072329 | A1 | 3/2014 | Uesugi et al. | |
| 2014/0072330 | A1 | 3/2014 | Yoshida et al. | |
| 2014/0072345 | A1 | 3/2014 | Matsunaga et al. | |
| 2014/0112685 | A1 | 4/2014 | Komatsu et al. | |
| 2014/0140723 | A1 | 5/2014 | Hoshi et al. | |
| 2014/0199093 | A1 | 7/2014 | Yoshida et al. | |
| 2014/0212181 | A1 | 7/2014 | Nakamura et al. | |
| 2014/0334844 | A1 | 11/2014 | Fukui et al. | |
| 2014/0363196 | A1 | 12/2014 | Wada et al. | |
| 2015/0010320 | A1 | 1/2015 | Komatsu et al. | |
| 2015/0220020 | A1 | 8/2015 | Hayashi et al. | |
| 2015/0234319 | A1 | 8/2015 | Matsumura et al. | |
| 2015/0234325 | A1 | 8/2015 | Satomura et al. | |
| 2015/0355576 | A1 | 12/2015 | Yamasaki et al. | |
| 2016/0252877 | A1 | 9/2016 | Nakamura et al. | |
| 2016/0370756 | A1 | 12/2016 | Komatsu et al. | |
| 2017/0108802 | A1* | 4/2017 | Murakami ......... | G03G 15/0891 |
| 2017/0235251 | A1 | 8/2017 | Matsuzaki et al. | |
| 2017/0248909 | A1 | 8/2017 | Nakamura et al. | |
| 2017/0293255 | A1 | 10/2017 | Uratani et al. | |
| 2017/0351214 | A1 | 12/2017 | Uesugi et al. | |
| 2018/0039226 | A1 | 2/2018 | Takeuchi et al. | |
| 2018/0046130 | A1 | 2/2018 | Komatsu et al. | |
| 2018/0113399 | A1 | 4/2018 | Matsuzaki et al. | |
| 2019/0094759 | A1 | 3/2019 | Matsuzaki et al. | |
| 2019/0129356 | A1 | 5/2019 | Murakami et al. | |
| 2019/0179249 | A1 | 6/2019 | Mori et al. | |
| 2019/0187608 | A1 | 6/2019 | Uesugi et al. | |
| 2019/0204779 | A1 | 7/2019 | Takeuchi et al. | |
| 2019/0354061 | A1 | 11/2019 | Uratani et al. | |
| 2019/0361383 | A1* | 11/2019 | Sato ........................ | G03G 21/12 |
| 2019/0384217 | A1* | 12/2019 | Sato ........................ | G03G 21/18 |
| 2020/0033791 | A1 | 1/2020 | Uesugi et al. | |
| 2020/0033792 | A1 | 1/2020 | Uesugi et al. | |
| 2020/0033793 | A1 | 1/2020 | Uesugi et al. | |
| 2020/0033794 | A1 | 1/2020 | Uesugi et al. | |
| 2020/0033795 | A1 | 1/2020 | Uesugi et al. | |
| 2020/0033796 | A1 | 1/2020 | Uesugi et al. | |
| 2020/0033797 | A1 | 1/2020 | Uesugi et al. | |
| 2020/0033798 | A1 | 1/2020 | Uesugi et al. | |
| 2020/0033799 | A1 | 1/2020 | Uesugi et al. | |
| 2020/0041954 | A1 | 2/2020 | Uesugi et al. | |
| 2020/0064773 | A1* | 2/2020 | Sato ................... | G03G 21/1817 |
| 2020/0073323 | A1 | 3/2020 | Uesugi et al. | |
| 2020/0073324 | A1 | 3/2020 | Uesugi et al. | |
| 2020/0142345 | A1 | 5/2020 | Mori et al. | |
| 2020/0150581 | A1 | 5/2020 | Komatsu et al. | |
| 2020/0174422 | A1 | 6/2020 | Takeuchi et al. | |
| 2020/0249622 | A1 | 8/2020 | Uratani et al. | |
| 2020/0257238 | A1 | 8/2020 | Uesugi et al. | |
| 2020/0272087 | A1 | 8/2020 | Sueshige et al. | |
| 2020/0401080 | A1 | 12/2020 | Maeda et al. | |
| 2021/0011419 | A1 | 1/2021 | Mori et al. | |
| 2021/0080867 | A1 | 3/2021 | Goto et al. | |
| 2021/0080868 | A1 | 3/2021 | Yamada et al. | |
| 2021/0286312 | A1 | 9/2021 | Uesugi et al. | |
| 2021/0286316 | A1 | 9/2021 | Murakami et al. | |
| 2021/0286317 | A1 | 9/2021 | Murakami et al. | |
| 2021/0311413 | A1 | 10/2021 | Yamada et al. | |
| 2021/0341870 | A1 | 11/2021 | Mori et al. | |
| 2021/0341873 | A1 | 11/2021 | Komatsu et al. | |
| 2022/0057730 | A1 | 2/2022 | Goto et al. | |
| 2022/0066385 | A1 | 3/2022 | Uesugi et al. | |
| 2022/0075312 | A1 | 3/2022 | Ozaki et al. | |
| 2022/0187758 | A1 | 6/2022 | Murakami et al. | |
| 2022/0206411 | A1 | 6/2022 | Matsuzaki et al. | |
| 2023/0032541 | A1 | 2/2023 | Komatsu et al. | |
| 2023/0032591 | A1 | 2/2023 | Murakami et al. | |
| 2023/0195032 | A1 | 6/2023 | Murakami et al. | |

OTHER PUBLICATIONS

Co-pending U.S. Appl. No. 18/207,736, filed Jun. 9, 2023.
Co-pending U.S. Appl. No. 18/208,405, filed Jun. 12, 2023.
Co-pending U.S. Appl. No. 18/210,152, filed Jun. 15, 2023.
Co-pending U.S. Appl. No. 18/212,241, filed Jun. 21, 2023.
Co-pending U.S. Appl. No. 18/212,783, filed Jun. 22, 2023.
Co-pending U.S. Appl. No. 18/229,722, filed Aug. 3, 2023.

* cited by examiner

PROCESS UNIT INCLUDING FIRST, SECOND AND THIRD CONVEYANCE MEMBERS FOR CONVEYING DEVELOPER

BACKGROUND OF THE INVENTION

Field of the Invention

The present invention relates to a cartridge.

Description of the Related Art

An image forming apparatus which forms an image on a recording medium by using electrophotography is known. Examples of the electrophotographic image forming apparatus include an electrophotographic copying machine, an electrophotographic printer (an LED printer, a laser-beam printer, and the like), a facsimile device, a word processor and the like.

Various cartridges are configured to be detachably attached to an apparatus main body of such the image forming apparatus as above. Examples of the cartridges include a development cartridge including development means and a process cartridge including the development means and a photosensitive drum. The cartridges refer to those typically having at least one of a developer, a photosensitive drum, and process means acting on the photosensitive drum and capable of being detachably attached to an image forming apparatus main body (printer main body). As a typical example of the cartridge, the process cartridge can be cited. This process cartridge is configured such that an image bearing member and process means acting on the image bearing member are made into a cartridge and is detachably attached to the apparatus main body. Moreover, a toner cartridge which supplies a toner to the process cartridge or the development cartridge is known.

Japanese Patent Application Publication No. 2012-208167 proposes such a configuration having a first screw conveyance portion which conveys a waste toner on a photosensitive drum which has been scraped by a cleaning blade in an axial direction of the photosensitive drum and a second screw conveyance portion which conveys the waste toner received from the first screw conveyance portion in a direction different from the axial direction of the photosensitive drum in a region not crossing the photosensitive drum in the axial direction of the photosensitive drum and supplies it to a waste toner box.

SUMMARY OF THE INVENTION

The present invention was made in view of the prior art described above and an object thereof is to develop an art in an image forming apparatus having such a configuration that the toner is conveyed by rotation of a conveyance member.

The present invention provides a cartridge comprising:

a rotatable image bearing member configured to bear a developer;

a cleaning member configured to remove the developer remaining on a surface of the image bearing member, the cleaning member including a contact portion in contact with a surface of the image bearing member and a support portion configured to support the contact portion;

a developer recovering portion configured to recover the developer removed by the cleaning member;

a first conveyance member disposed inside the developer recovering portion and configured to convey the recovered developer in a rotation axis direction of the image bearing member; and a second conveyance member configured to convey the developer conveyed by the first conveyance member in a direction crossing the rotation axis direction toward a discharge port provided in the developer recovering portion, wherein in the rotation axis direction, the second conveyance member is disposed in an inner side of the contact portion of the cleaning member with respect to an end part of the contact portion of the cleaning member.

According to the present invention, the art in the image forming apparatus having the configuration that the toner is conveyed by rotation of the conveyance member can be developed.

Further features of the present invention will become apparent from the following description of exemplary embodiments with reference to the attached drawings.

DESCRIPTION OF THE EMBODIMENTS

Embodiment 1

Hereinafter, Embodiments for working the present invention will be explained in exemplification in detail. However, dimensions, materials, shapes, relative dispositions thereof and the like of components described in the following Embodiments should be changed as appropriate in accordance with configurations and various conditions of apparatuses to which the present invention is applied. Therefore, the scope of the present invention is not limited to that unless otherwise specifically described.

Overall Outline of Laser Printer

Figure 1:
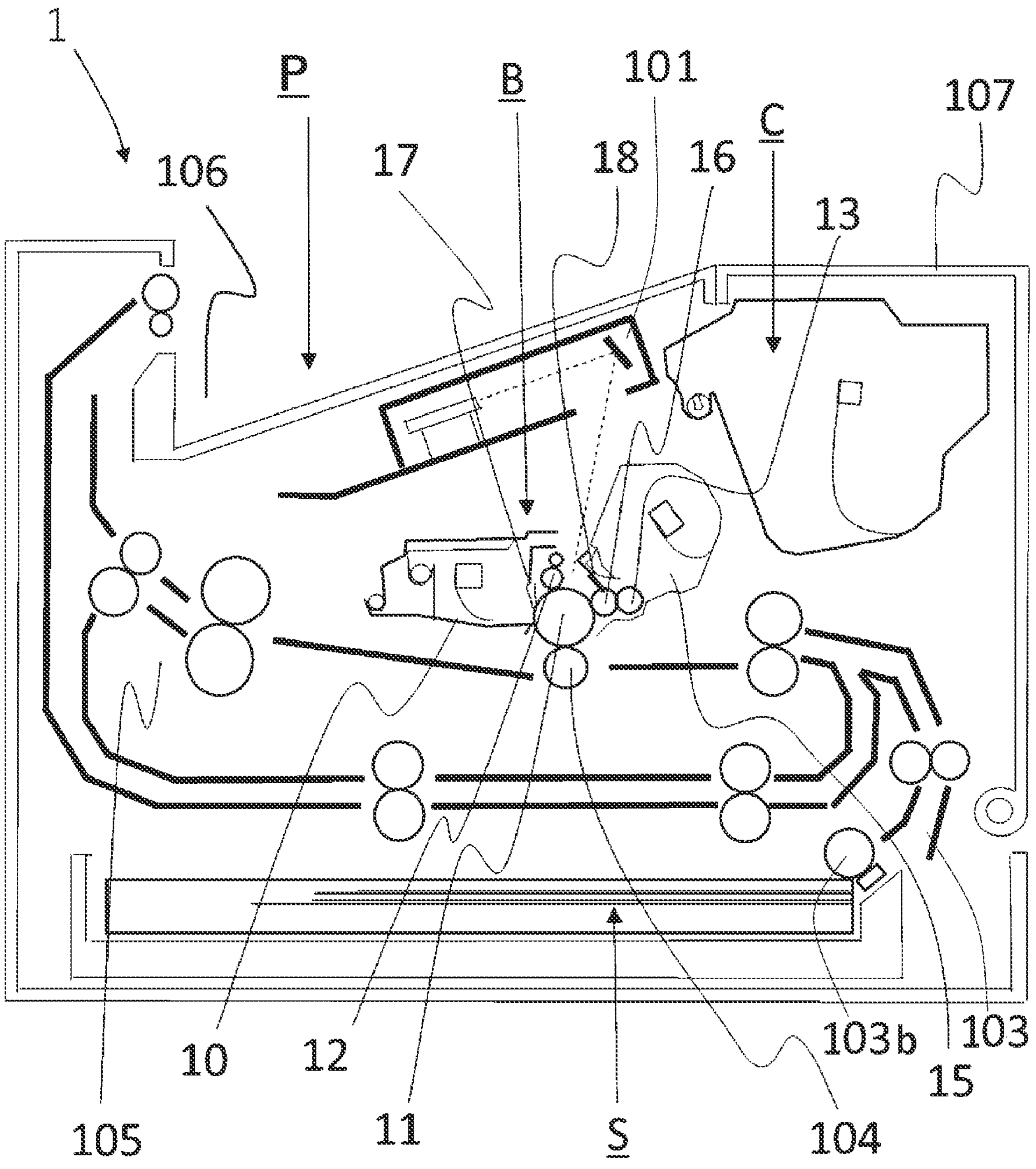
FIG. 1 is a sectional view illustrating a schematic configuration of a laser printer.

FIG. 1 is a sectional view illustrating a schematic configuration of a laser printer, which is an example of an image forming apparatus. As shown in FIG. 1, the laser printer 1 is configured by including a printer main body P, a process cartridge B, and a toner cartridge C. In the printer main body P, a sheet feeding portion 103, a transfer roller 104, a fixing portion 105, and a laser scanner 101 are installed. Moreover, in the printer main body P, the process cartridge B and the toner cartridge C are detachably disposed.

Figure 2:
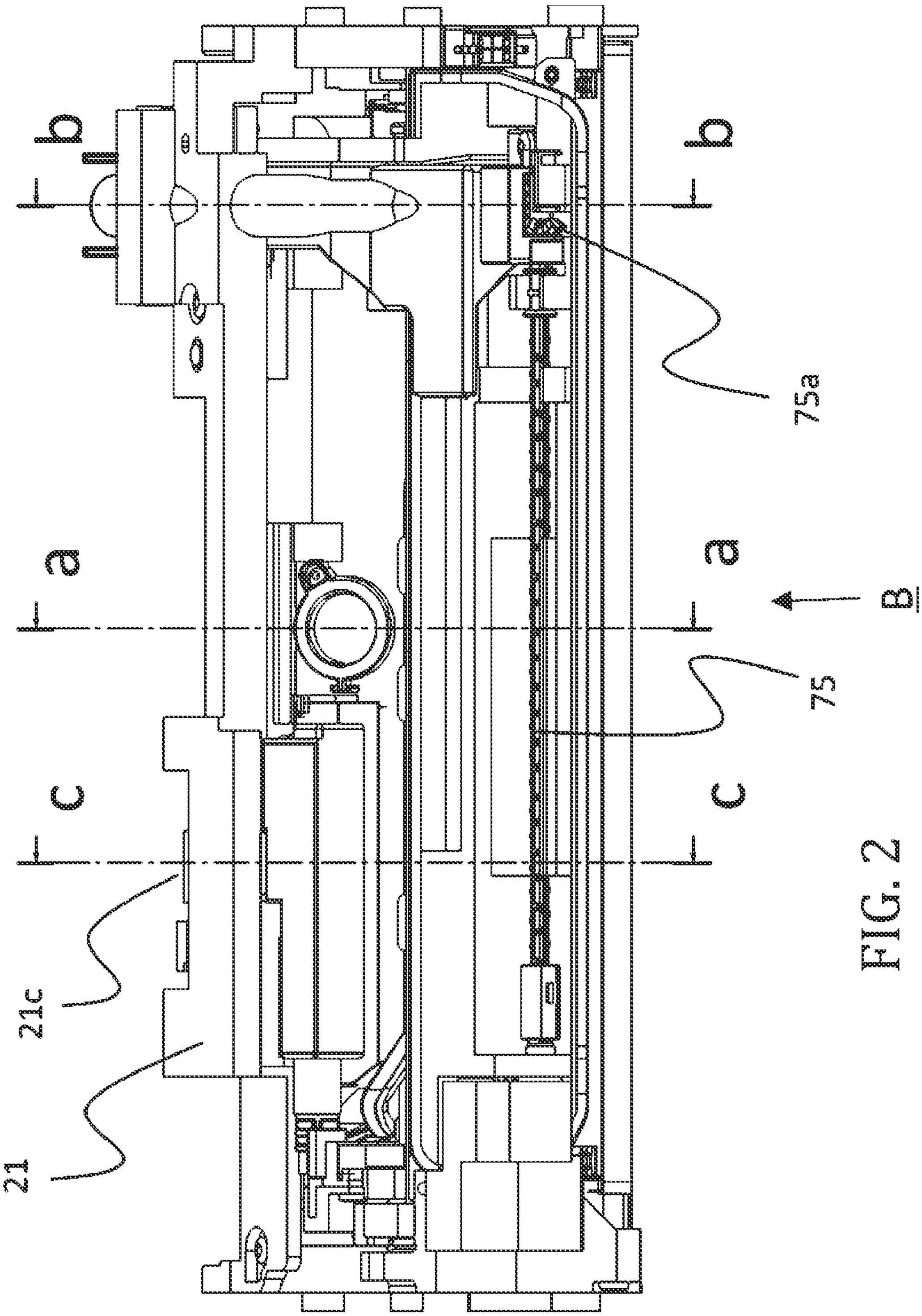
FIG. 2 is a front view illustrating an outline of a process cartridge.
Figure 3:
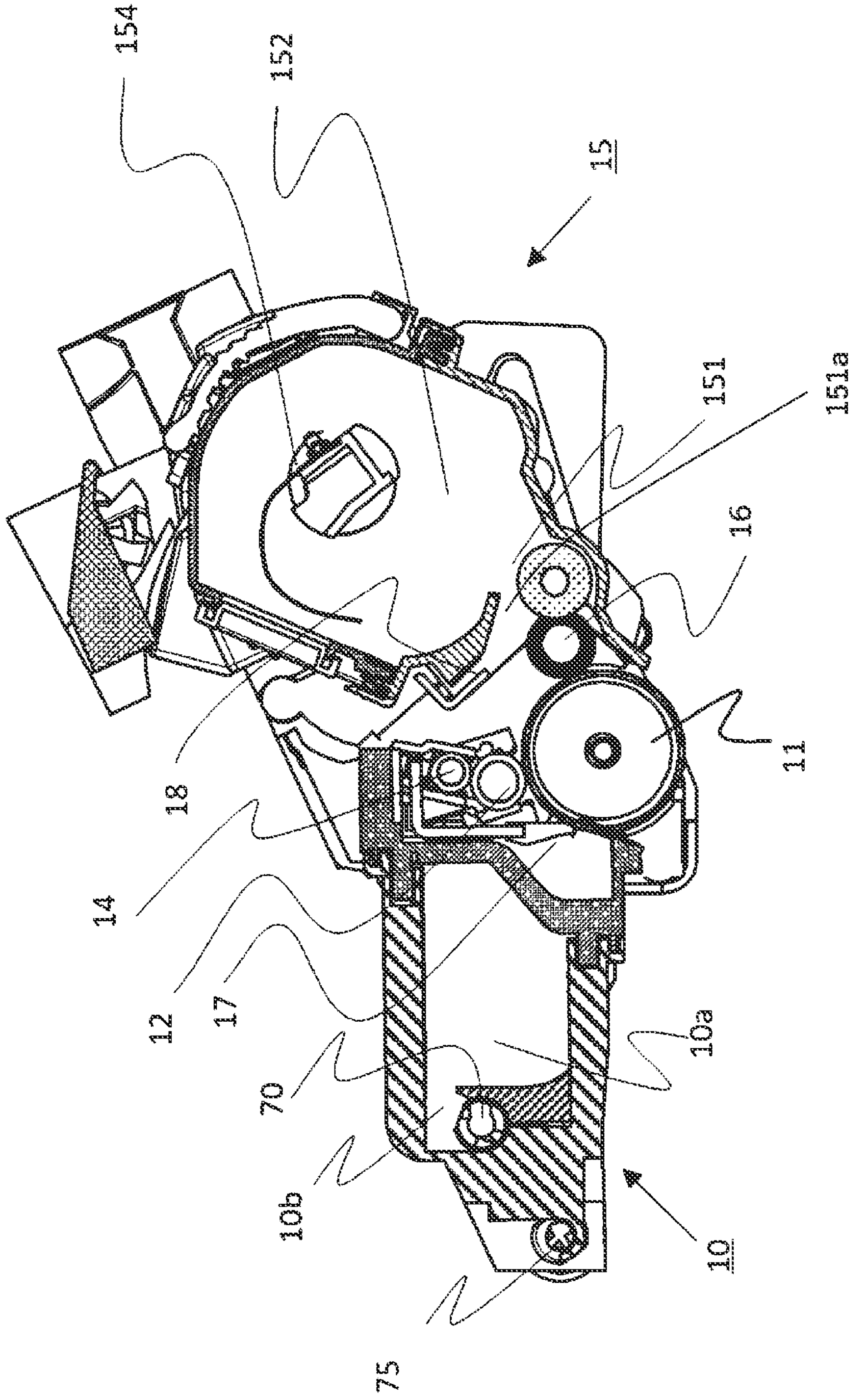
FIG. 3 is a sectional view illustrating a schematic configuration of the process cartridge.
Figure 4:
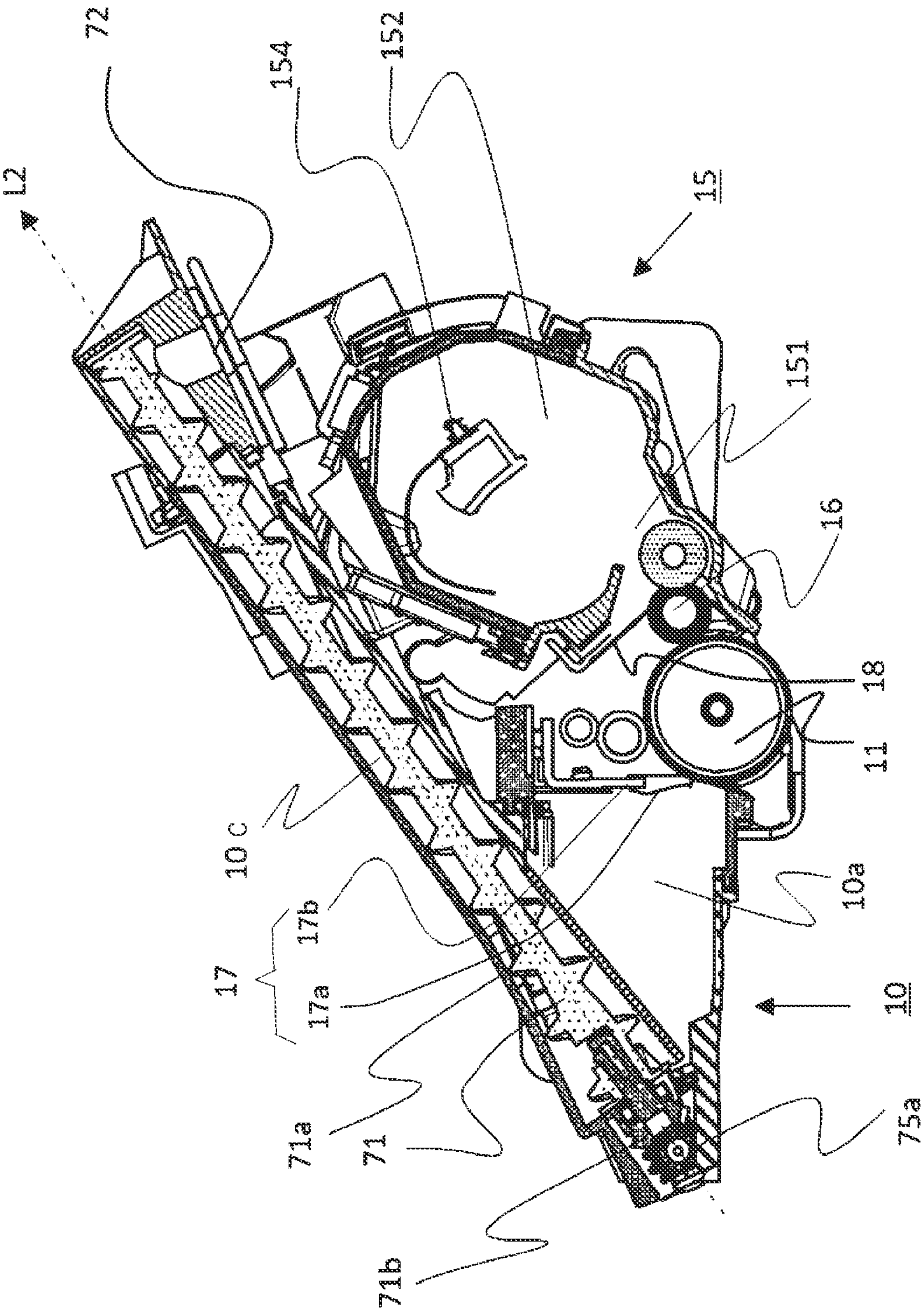
FIG. 4 is a sectional view illustrating a second toner conveyance path of the process cartridge.
Figure 5:
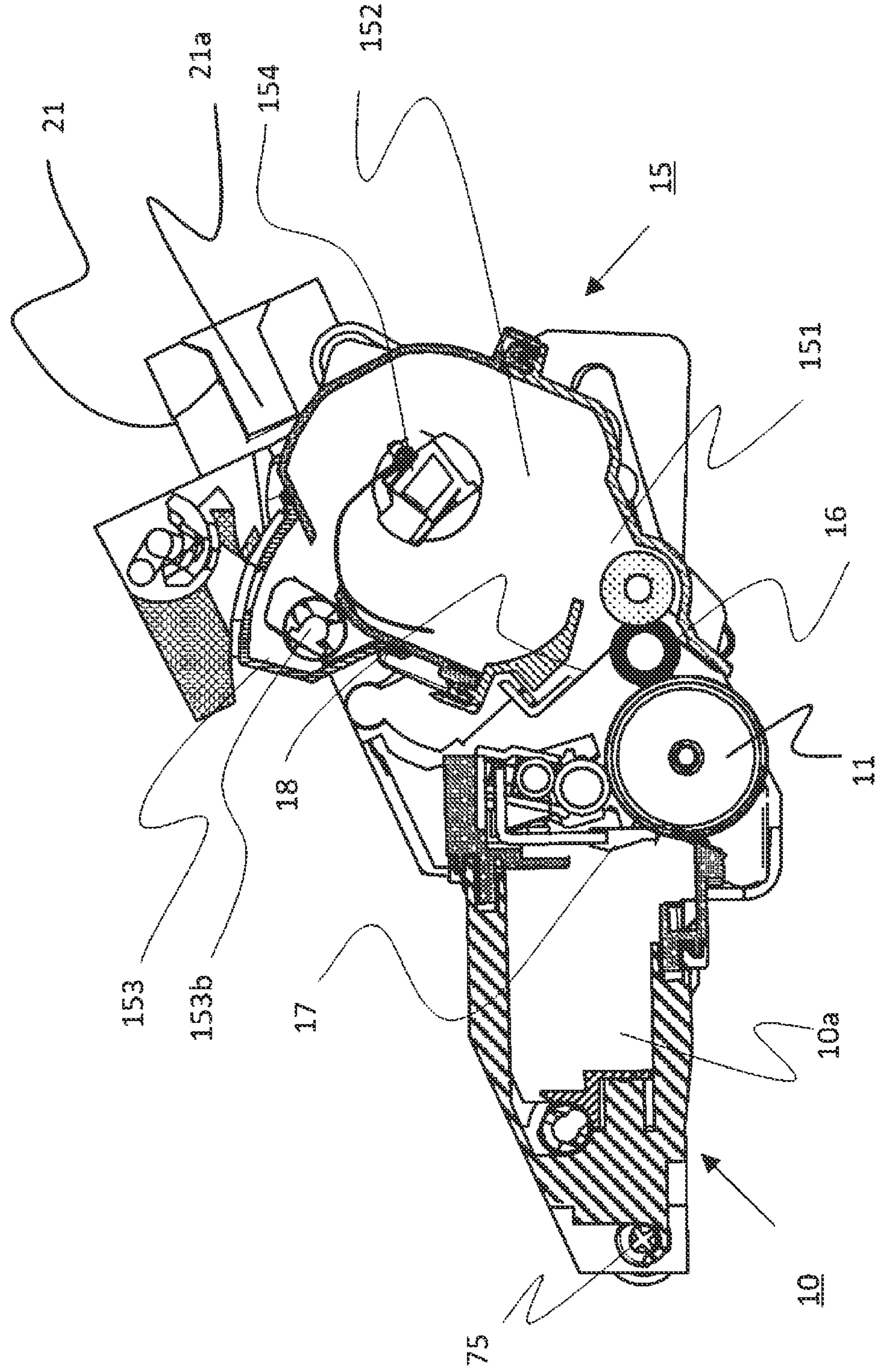
FIG. 5 is a section illustrating a replenishing port of the process cartridge.

The process cartridge B will be explained by using FIGS. 2, 3, 4, and 5. FIG. 2 is a front view illustrating an outline of the process cartridge B. FIG. 3 is a sectional view illustrating a schematic configuration of the process cartridge B (a-a section in FIG. 2). FIG. 4 is a sectional view (b-b section in FIG. 2) illustrating a second toner conveyance path 10*c* of the process cartridge B. FIG. 5 is a sectional view (c-c section in FIG. 2) illustrating a replenishing port of the process cartridge B.

As shown in FIGS. 2, 3, 4, and 5, the process cartridge B is constituted by a cleaning unit 10 (first unit) including a photosensitive drum 11 (image bearing member) and a development unit 15 (second unit) including a development roller 16 as development means for bearing a developer (toner).

The cleaning unit 10 has the photosensitive drum 11 described above, a cleaning blade 17 as a cleaning member of the photosensitive drum 11, a charging roller 12 as a charging member, a charging roller cleaner 14 as a cleaning member of the charging roller 12, a waste-toner accommodating portion 10*a*, and the second toner conveyance path 10*c*.

The charging roller 12 is disposed so as to be in contact with an outer peripheral surface of the photosensitive drum 11 and charges the photosensitive drum 11 by voltage application from the printer main body P. Moreover, the charging roller 12 is driven and rotated by the photosensitive drum 11.

The cleaning blade 17 is a member having elasticity disposed so as to be in contact with the outer peripheral surface of the photosensitive drum 11. The cleaning blade 17 is constituted by a blade portion 17*a* (contact portion) constituted by an elastic member and a support member 17*b* (support portion). The cleaning blade 17 removes the toner remaining from the photosensitive drum 11 by a distal end thereof elastically in contact with the photosensitive drum 11, after a sheet S, which will be described later, passes between the photosensitive drum 11 and the transfer roller 104. The removed tonner (waste toner) is conveyed from the waste-toner accommodating portion 10*a*, which will be described later, to the toner cartridge C through a first toner conveyance path 10*b* and the second toner conveyance path 10*c*.

As shown in FIG. 5, the development unit 15 has a development chamber 151 in which the development roller 16 is disposed, a developer accommodating chamber 152 which supplies a toner to the development chamber 151, and a toner accepting chamber 153 which accepts the toner supplied from the toner cartridge C.

The development roller 16 supplies a toner to a development region of the photosensitive drum 11. Then, the development roller 16 develops an electrostatic latent image formed on the photosensitive drum 11 by using the toner. The development blade 18 is brought into contact with a peripheral surface of the development roller 16 and regulates an amount of the toner adhering to the peripheral surface of the development roller 16. Moreover, it applies a triboelectric charge to the toner.

The toner accommodated in the developer accommodating chamber 152 is sent out to the development chamber 151 by rotation of a stirring member 154 and is supplied to the development roller 16. A remaining amount of the toner in the developer accommodating chamber 152 is detected by remaining-amount detecting means, not shown, and when the toner amount in the developer accommodating chamber 152 becomes certain or less, the toner is supplied from the toner cartridge C to the process cartridge B. The toner having been supplied to the development unit 15 through a replenishing port 21*c* and a delivery port 21*d* of the stay 21 is supplied to the developer accommodating chamber 152 through the accepting chamber 153.

Though details will be described later, the process cartridge B and the toner cartridge C can be detachably attached to the printer main body P.

Subsequently, an operation of the laser printer 1 will be explained by using FIG. 1. The photosensitive drum 11 rotated and driven by a drive source, not shown, is uniformly charged by the charging roller 12 to a predetermined potential. A surface of the photosensitive drum 11 after the charging is exposed by the laser scanner 101 on the basis of image information, charge on an exposed part is removed, and the electrostatic latent image is formed. The toner is supplied from the development roller 16 to the electrostatic latent image on the photosensitive drum 11 and is visualized as a toner image.

On the other hand, in parallel with a forming operation of the toner image as above, the sheet S is conveyed along the sheet feeding portion 103. Specifically, a feeding roller 103*b* is rotated and feeds the sheet S. After that, the sheet S is conveyed to a nip portion between the photosensitive drum 11 and the transfer roller 104 by matching timing with image forming of the toner image on the photosensitive drum 11. When passing through the nip portion, the toner image is transferred as an unfixed image on the sheet S by bias application to the transfer roller 104. After that, the sheet S on which the toner image has been transferred is conveyed to the fixing portion 105. When the sheet S having been conveyed to the fixing portion 105 passes through the fixing portion 105, the unfixed image is heated and pressurized and fixed on the surface of the sheet S. Moreover, it is conveyed by the sheet feeding portion 103, ejected to an ejection tray 106 and stacked.

Outline of Process Cartridge B

Figure 9A:
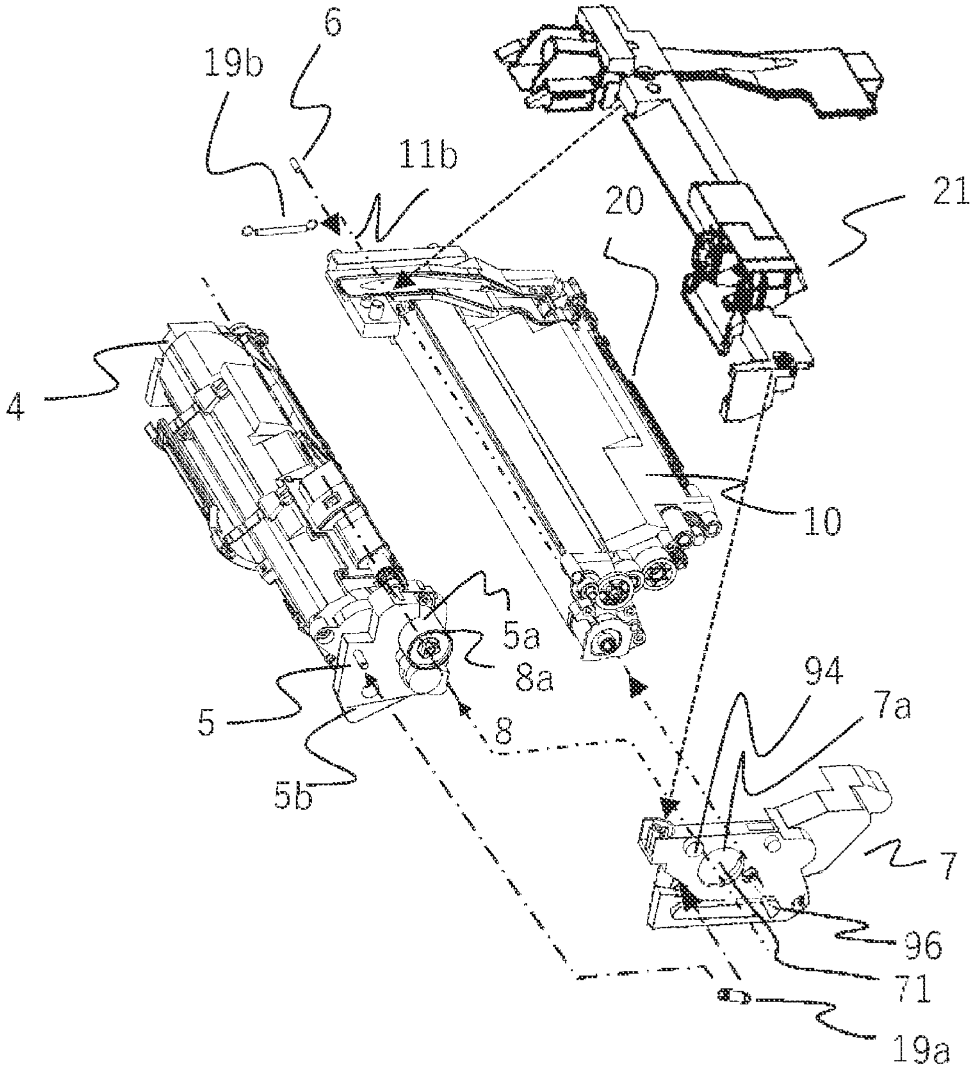
FIG. 9A is an exploded perspective view of the process cartridge.
Figure 9B:
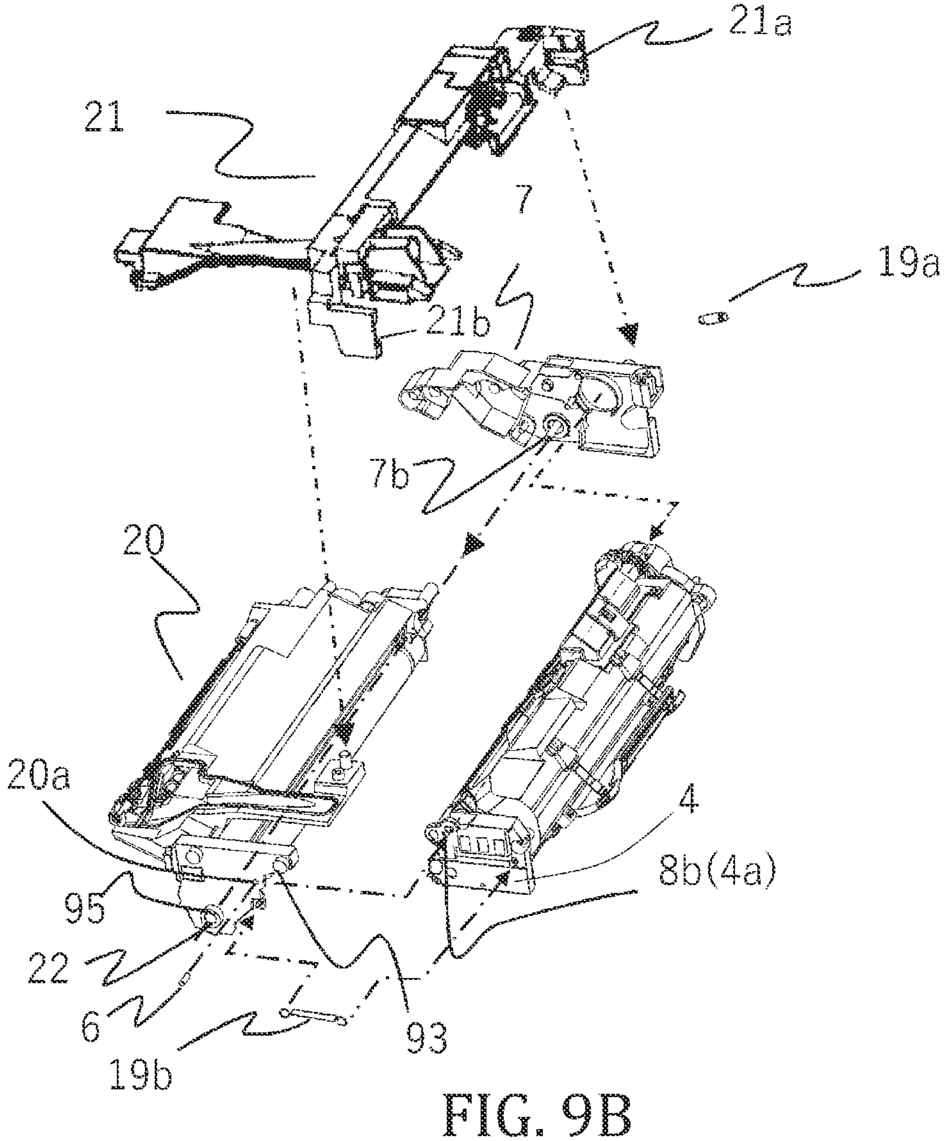
FIG. 9B is an exploded perspective view in a different direction of the process cartridge.
Figure 10A:
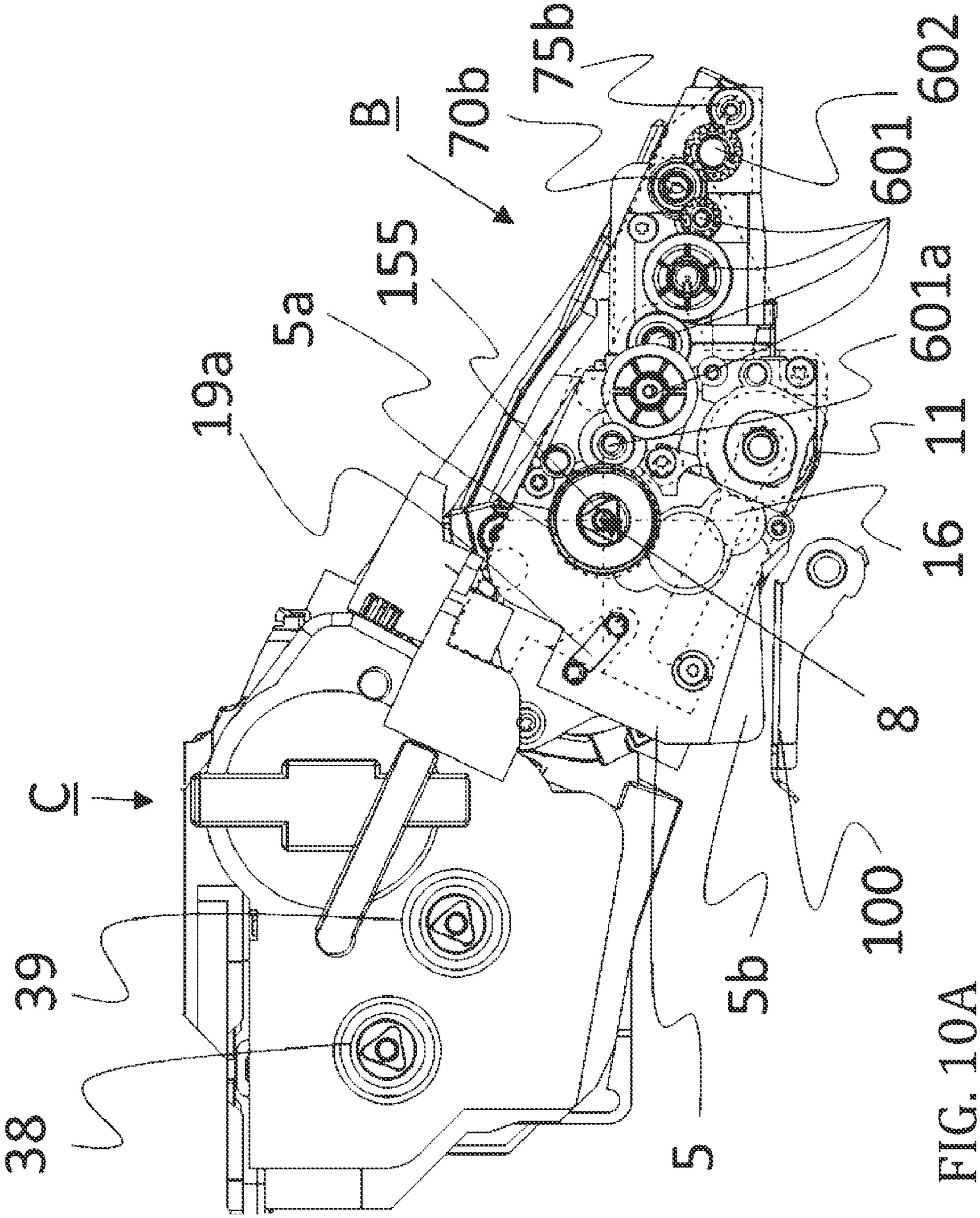
FIG. 10A is a schematic side view illustrating contact of a development unit with a photosensitive drum.
Figure 10B:
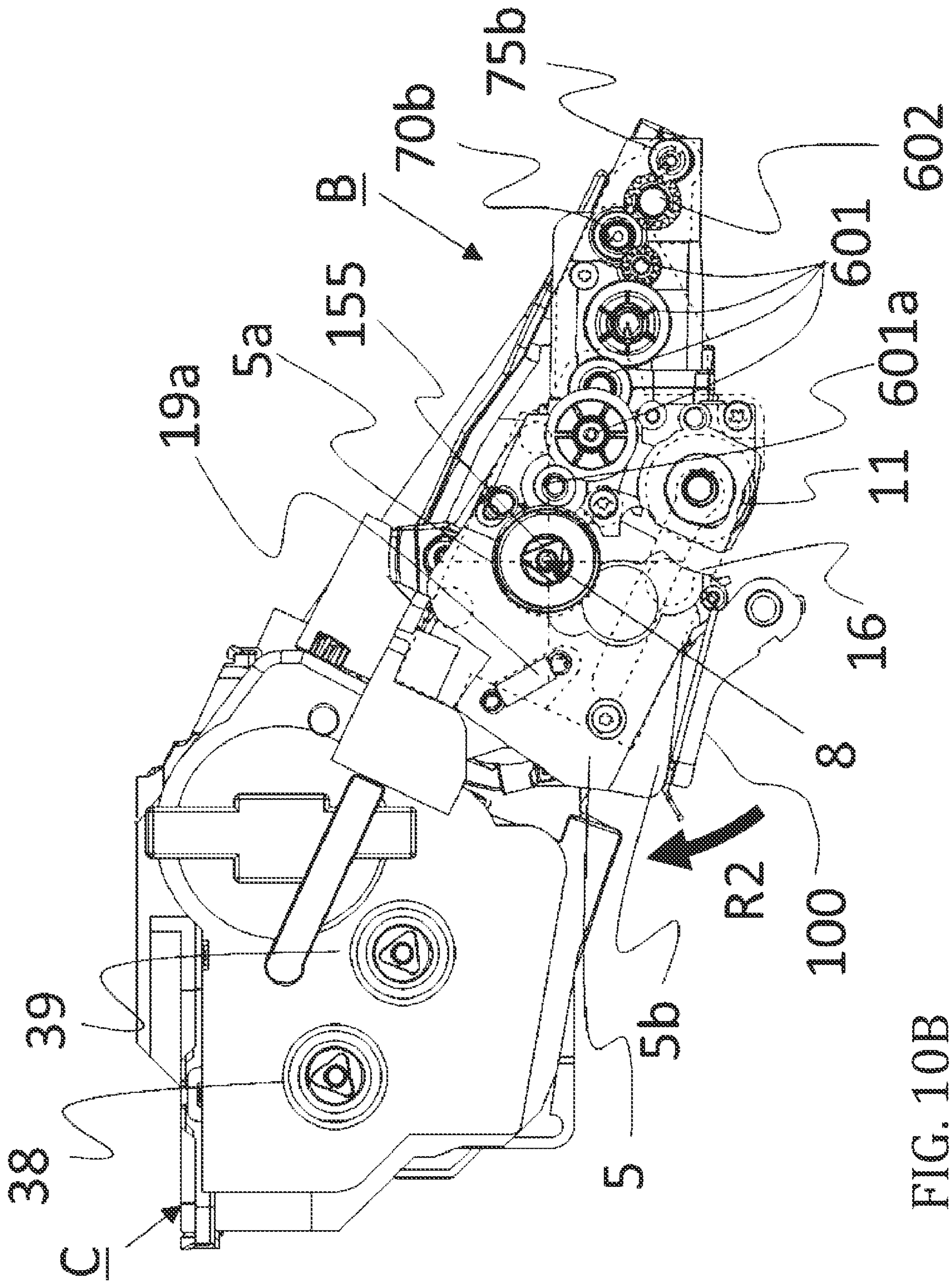
FIG. 10B is a schematic side view illustrating separation of the development unit from the photosensitive drum.

By using FIGS. 3, 9A, 9B, 10A, and 10B, the configuration of the process cartridge B in this Embodiment will be explained in detail. FIG. 9A is an exploded perspective view of the process cartridge B seen from a side (one end side) where drive from the printer main body P is transmitted to the process cartridge B. FIG. 9B is an exploded perspective view of the process cartridge B seen from a side opposite to FIG. 9A (the other end side) with respect to the axial direction of the photosensitive drum 11. FIG. 10A is a schematic side view illustrating contact of the development unit 15 with respect to the photosensitive drum 11 in the process cartridge. FIG. 10B is a schematic side view illustrating separation of the development unit 15 with respect to the photosensitive drum 11 in the process cartridge.

As described above, the cleaning unit 10 has the photosensitive drum 11, the charging roller 12, and the cleaning blade 17. Similarly, the development unit 15 has the development roller 16, the development blade 18, the development chamber 151, the developer accommodating chamber 152, and the toner accepting chamber 153.

As shown in FIGS. 9A and 9B, bearing members 4, 5 are disposed on an end part in the axial direction of the development roller 16, and the development unit 15 is connected to the cleaning unit 10 rotatably around a swing axis 8 defined by a straight line including a spindle 8*a* and a spindle 8*b*. The swing axis 8 is disposed substantially in parallel with a rotation axis 11*b* of the photosensitive drum 11.

A configuration in which the development unit 15 is supported by the cleaning unit 10 will be explained in detail.

As shown in FIG. 9A, a gear member 5*a* provided on the bearing member 5 is supported by a cylindrical hole shape 7*a* provided in a side cover 7 of the cleaning unit 10. The spindle 8*a* is defined by a common axis of the cylindrical hole shape 7*a* of the side cover 7 and the gear member 5*a*. Moreover, as shown in FIG. 9B, a pin 6 is inserted so as to go across a cylindrical hole shape 20*a* of a cleaning frame body 20 and the cylindrical hole shape 4*a* of the bearing member 4. The spindle 8*b* is defined by a common axis of the pin 6 and the cylindrical hole shape 4*a* of the bearing member 4. The spindle 8*a* and the spindle 8*b* are disposed substantially coaxially, and the swing axis 8 is defined by a straight line including the spindle 8*a* and the spindle 8*b* as described above.

As described above, the development unit 15 is supported rotatably around the swing axis 8 with respect to the cleaning unit 10. The development unit 15 is urged to the cleaning unit 10 by a pressurizing spring 19*a* and a pressurizing spring 19*b*, which are elastic members, and the development roller 16 is brought into contact with the photosensitive drum 11.

Subsequently, a separation mechanism 100 which performs a contact/separation operation of the development unit 15 with respect to the cleaning unit 10 will be explained by using FIGS. 10A and 10B. FIGS. 10A and 10B are shown without the side cover 7 in order to illustrate the separation mechanism 100 provided in the printer main body P.

As shown in FIG. 10A, a protruding portion 5*b* is provided on the bearing member 5. At a position where the protruding portion 5*b* is not in contact with the separation mechanism 100 as in FIG. 10A, the development roller 16 is in contact with the photosensitive drum 11. This state is an image forming position where the electrostatic latent image formed on the surface of the photosensitive drum 11 by the development roller 16 is developed.

As shown in FIG. 10B, when the separation mechanism 100 provided in the printer main body P is brought into contact with the protruding portion 5*b* and receives a force, the development unit 15 is rotated in an R2 direction with the swing axis 8 as a rotation center, and the photosensitive drum 11 and the development roller 16 are separated. This state is a non-image forming position retreated from the image forming position.

When the separation mechanism 100 returns to the original position, it is separated from the protruding portion 5*b*, and the development roller 16 and the photosensitive drum 11 are in contact again as in FIG. 10A by the pressurizing spring 19*a* and the pressurizing spring 19*b*.

As described above, the contact position (image forming position) and the separation position (non-image forming position) of the process cartridge B can be switched (movable) by the separation mechanism 100. As a result, an attitude of the development unit 15 in the process cartridge B can be switched between the contact position and the separation position with respect to the photosensitive drum 11. As a result, deterioration of the toner can be suppressed, and unnecessary toner consumption at non-image forming can be suppressed.

As shown in FIGS. 9A and 9B, the cleaning unit 10 is constituted by the cleaning frame body 20, the stay 21, and the side cover 7. The cleaning frame body 20 supports the cleaning blade 17, the charging roller 12, and the charging roller cleaner 14. The photosensitive drum 11 is rotatably supported on one side by a drum pin 22 mounted on the cleaning frame body 20 and on the opposite side by a photosensitive-drum supporting portion 7*b* provided on the side cover 7.

Outline of Toner Cartridge C

Figure 6:
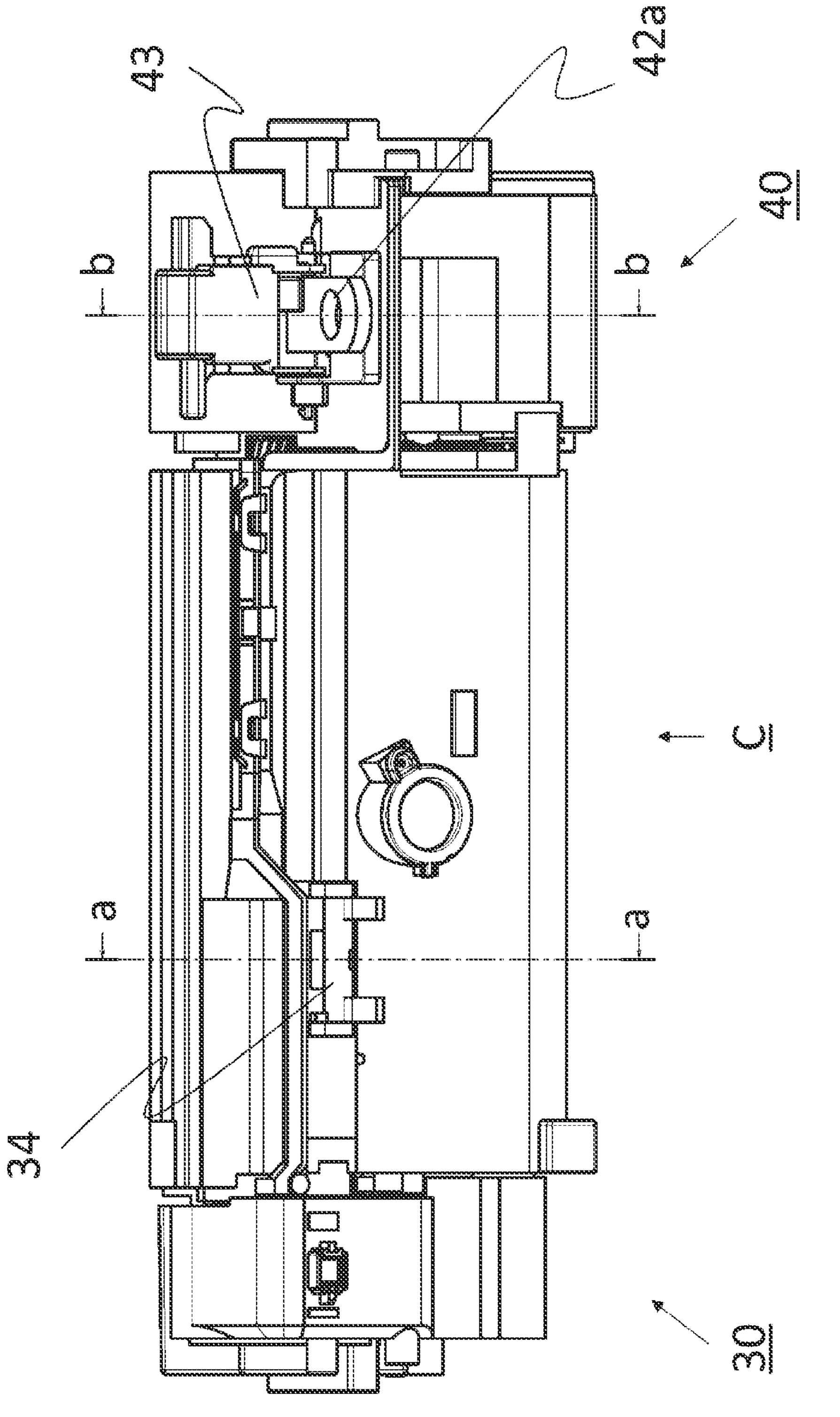
FIG. 6 is a front view illustrating an outline of a toner cartridge.
Figure 7:
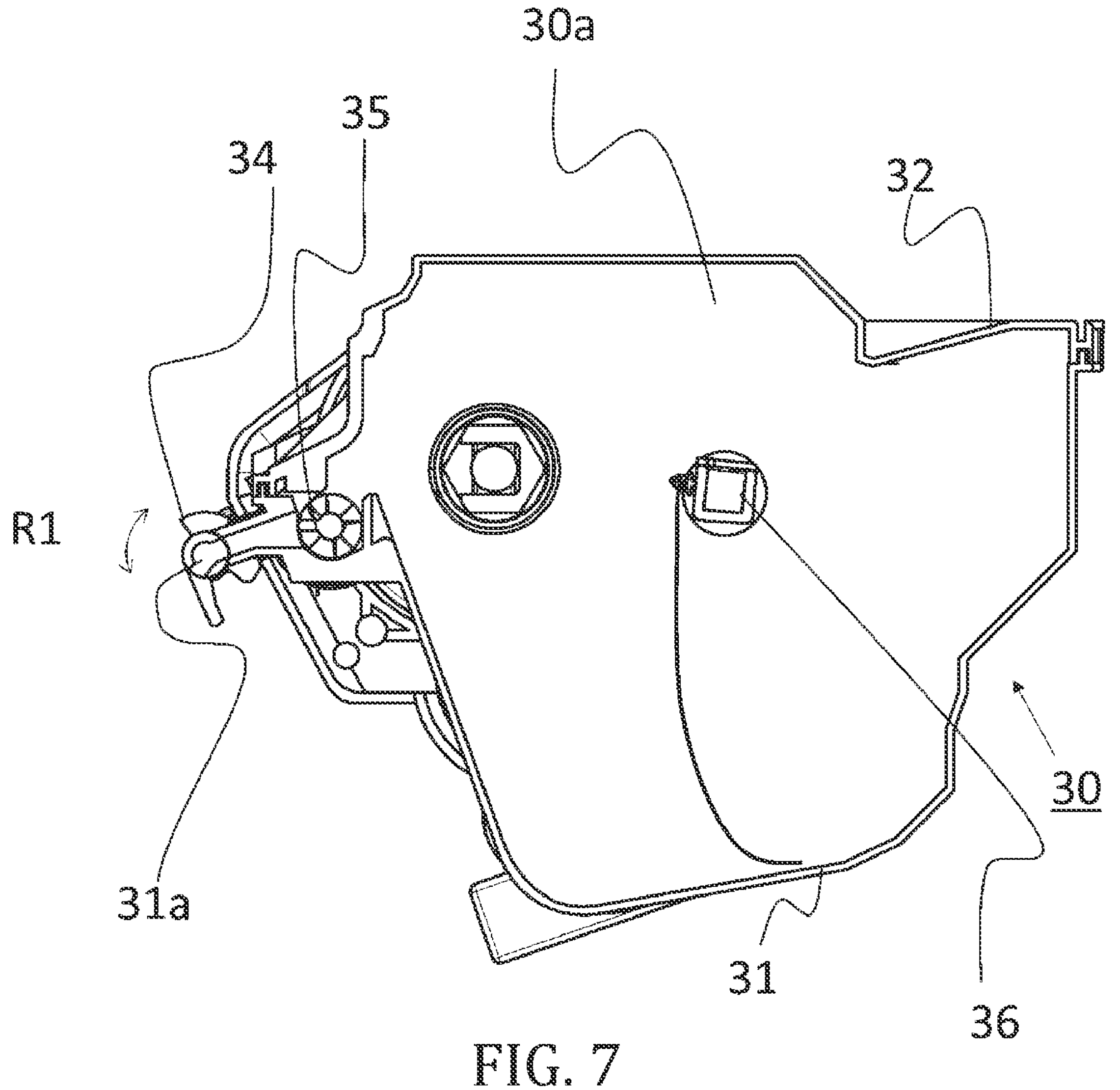
FIG. 7 is a sectional view illustrating a toner supply portion of the toner cartridge.
Figure 8:
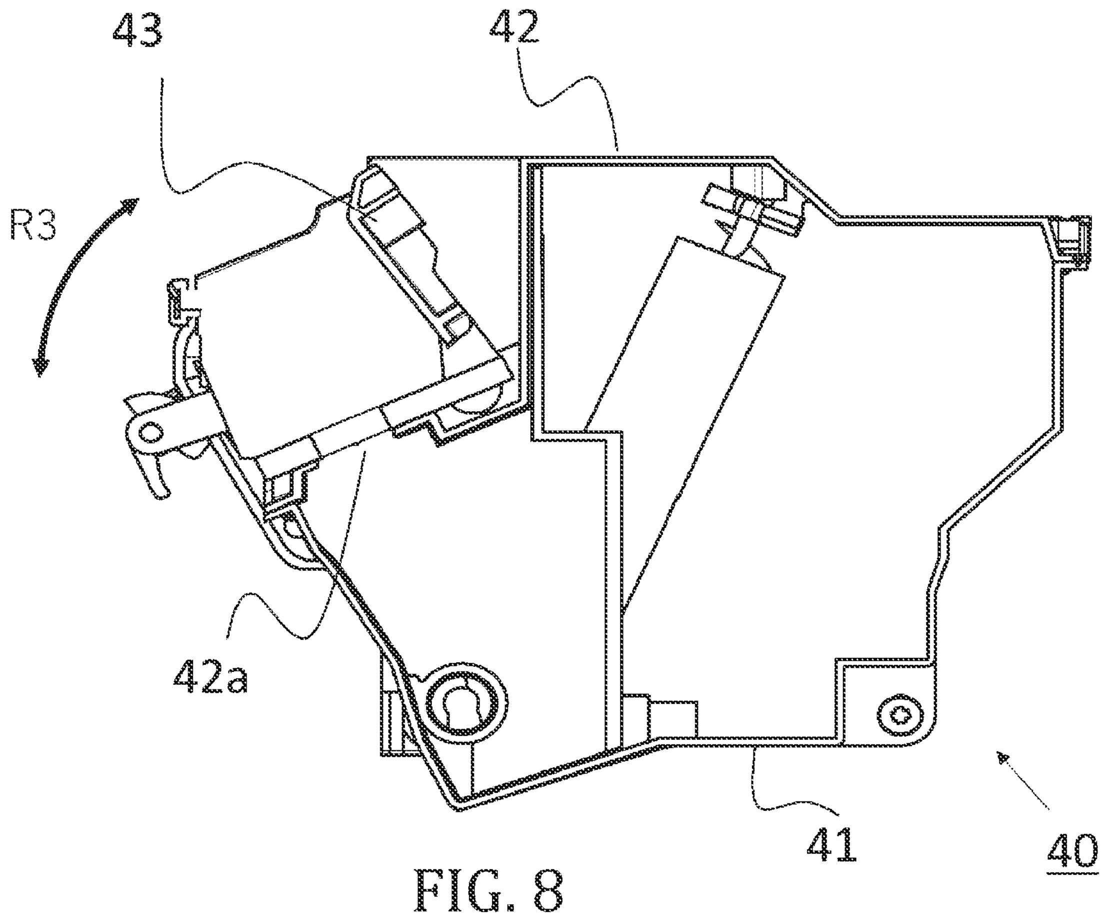
FIG. 8 is a sectional view illustrating a waste-toner recovering portion of the toner cartridge.
Figure 13A:
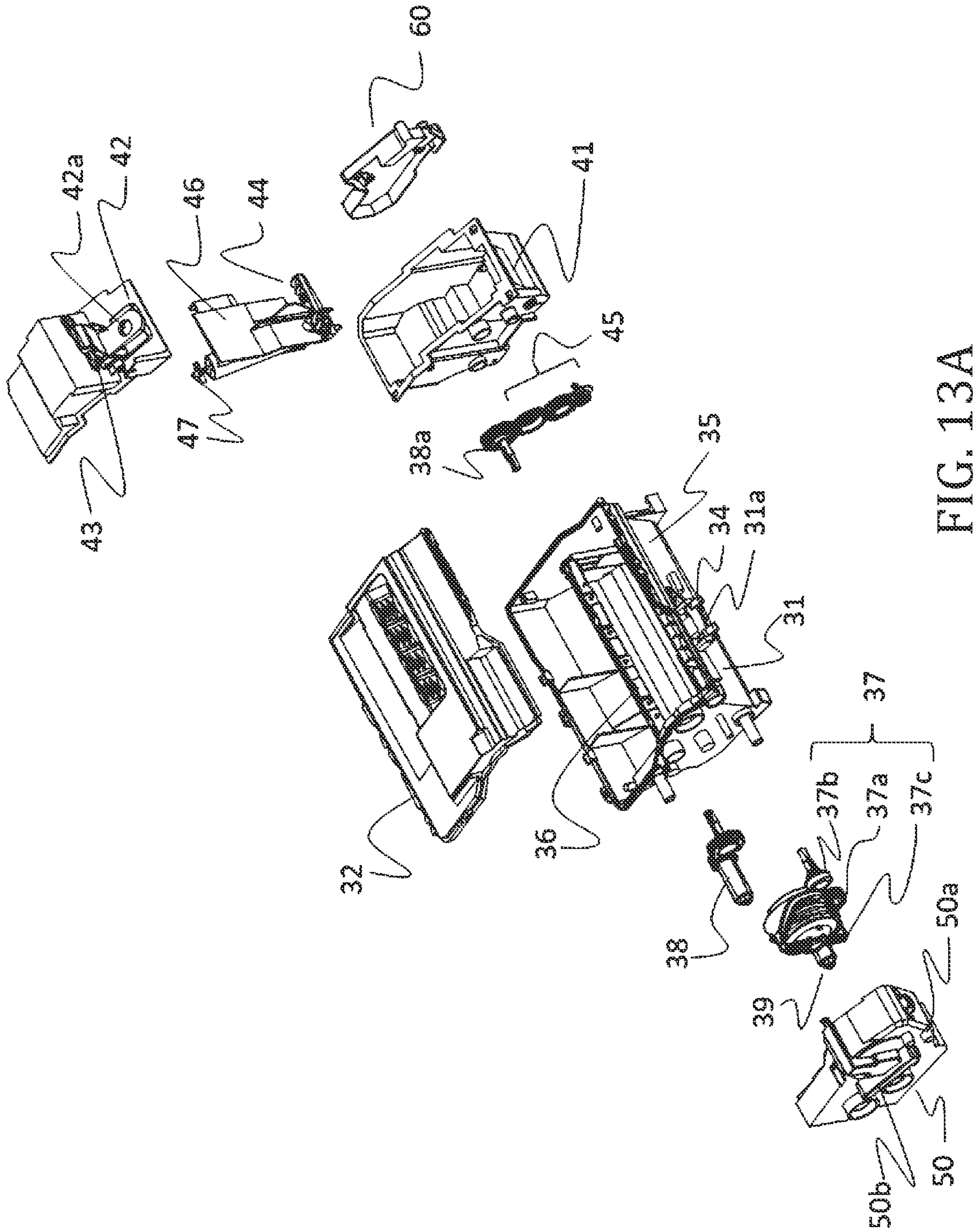
FIG. 13A is an exploded perspective view of the toner cartridge.
Figure 13B:
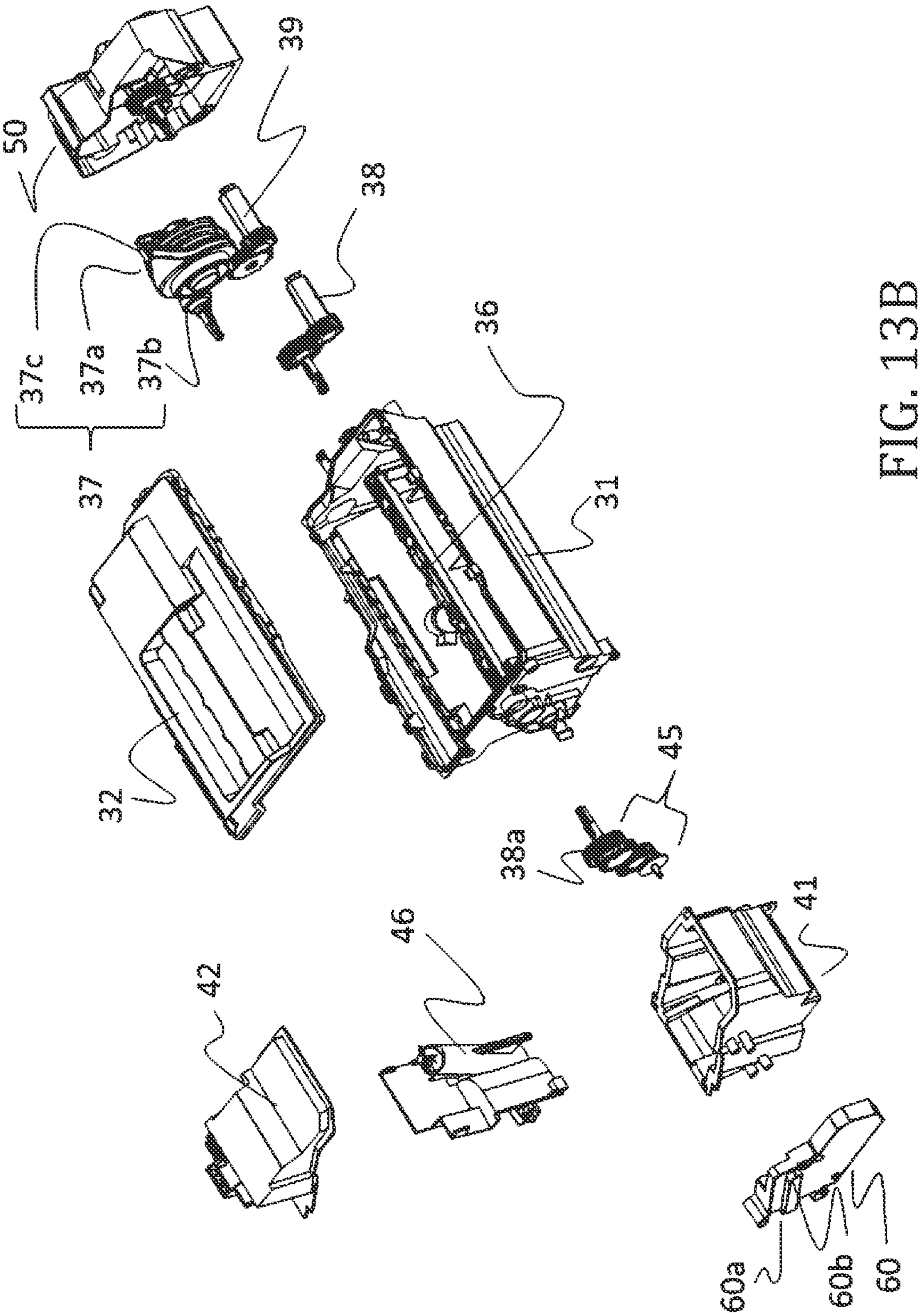
FIG. 13B is an exploded perspective view in a different direction of the toner cartridge.

The toner cartridge C will be explained by using FIGS. 6, 7, 8, 13A, and 13B. FIG. 6 is a front view illustrating an outline of the toner cartridge C. FIG. 7 is a sectional view (a-a section in FIG. 6) illustrating a toner supply portion 30 of the toner cartridge C. FIG. 8 is a sectional view (b-b section in FIG. 6) illustrating the waste-toner recovering portion 40 of the toner cartridge C. FIG. 13A is an exploded perspective view of the toner cartridge C seen from the side (one end side) where the drive from the printer main body P is transmitted to the toner cartridge C. FIG. 13B is an exploded perspective view of the toner cartridge C seen from the side opposite to FIG. 13A (the other end side) with respect to the axial direction of the photosensitive drum 11.

As shown in FIGS. 6, 7, and 8, the toner cartridge C has the toner supply portion 30 which supplies the toner to the process cartridge B and the waste-toner recovering portion 40 which recovers the waste toner from the process cartridge B.

An outline of the toner supply portion 30 will be described below. As shown in FIGS. 7, 8, 13A, and 13B, a toner accommodating portion 30*a* of the toner supply portion 30 is formed by a supply-portion frame body 31 and a supply-portion lid 32. The supply-portion frame body 31 has a toner discharge port 31*a* which discharges the toner from the toner accommodating portion 30*a* and a shutter member 34 which opens/closes the toner discharge port 31*a* by rotating in an R1 direction by interlocking with attachment of the toner cartridge C on an outside of the supply-portion frame body 31.

The toner accommodating portion 30*a* has a screw member 35 which conveys the toner toward the toner discharge port 31*a* and a stirring conveyance unit 36 which conveys the toner toward the screw member 35.

The toner having been conveyed to the toner discharge port 31*a* is discharged by volume variation of a pump 37*a*. Specifically, as shown in FIG. 13A, it has a pump unit 37. The pump unit 37 has the pump 37*a* which changes the volume by expansion/contraction, a cam 37*b* which expands/contracts the pump 37*a* by rotation, and a link arm 37*c*.

Moreover, a drive configuration of the toner supply portion 30 will be explained by using FIG. 13A. The toner supply portion 30 has a drive input portion 38 (first drive-input portion) which drives the conveyance unit 36 and a drive input portion 39 (second drive-input portion) which drives the pump unit 37 and the screw member 35.

Subsequently, an outline of the waste-toner recovering portion 40 will be described below. As shown in FIG. 8, the waste-toner recovering portion 40 has a frame body 41 and an accommodating lid 42 provided on an upper part of the frame body 41 with respect to the gravity direction. In the accommodating lid 42, a waste-toner accepting port 42*a* is provided. Moreover, the waste-toner recovering portion 40 has a shutter member 43 which opens/closes the waste-toner accepting port 42*a*. The shutter member 43 is opened/closed in an R3 direction by interlocking with attachment/detachment of the toner cartridge C with respect to the printer main body P.

As shown in FIG. 13A, in the waste-toner recovering portion 40, a partition member 46, a first screw 44, and a second screw 47 are disposed. The first screw 44 conveys the waste toner falling from the waste-toner accepting port 42*a* in the axial direction of the photosensitive drum 11. The second screw 47 rotates by receiving a drive force from the rotation of the first screw 44 and conveys the waste toner conveyed by the first screw 44 diagonally upward relative to the gravity direction.

The drive of the waste-toner recovering portion 40 is obtained as described below. As shown in FIGS. 13A and 13B, the drive force input by the drive input portion 38 described above is transmitted to a non-drive side of the toner supply portion 30 through the conveyance unit 36 and is transmitted to a gear 38*a*. The drive force transmitted to the gear 38*a* is transmitted to the first screw 44 through a gear train 45.

On the toner supply portion 30 side (drive side), the side cover 50 is mounted, while on the waste-toner recovering portion 40 side (non-drive side), the side cover 60 is mounted, respectively. In the configuration of this Embodiment, as also shown in FIGS. 10A and 10B, the drive input portion 38 and the drive input portion 39 are driven, respectively, by the drive force from a drive source provided in the printer main body P.

By means of the configuration as above, even when the drive input portion 39 is not driven, the drive input portion 38 can be driven. That is, even w % ben the toner supply portion 30 is not replenishing the toner to the process cartridge B, a state where the waste toner can be recovered can be maintained by driving the first screw 44 and the second screw 47 in the waste-toner recovering portion 40.

Moreover, since the input of the drive from the printer main body P can be disposed on the one end side (drive side) of the toner cartridge C, the gear train of the printer main body P can be simplified. Furthermore, by transmitting the drive from the one end side to the other end side of the supply-portion frame body 31 by using the conveyance unit 36, the drive can be transmitted to the waste-toner recovering portion 40 without increasing components for drive transmission. As a result, while size increase of the toner cartridge C and the printer main body P with respect to the axial direction of the photosensitive drum 11 by the drive means of the toner cartridge C is suppressed, the waste toner can be accommodated in the toner cartridge C.

Attaching/Detaching Method of Process Cartridge B, Toner Cartridge C

Figure 11A:
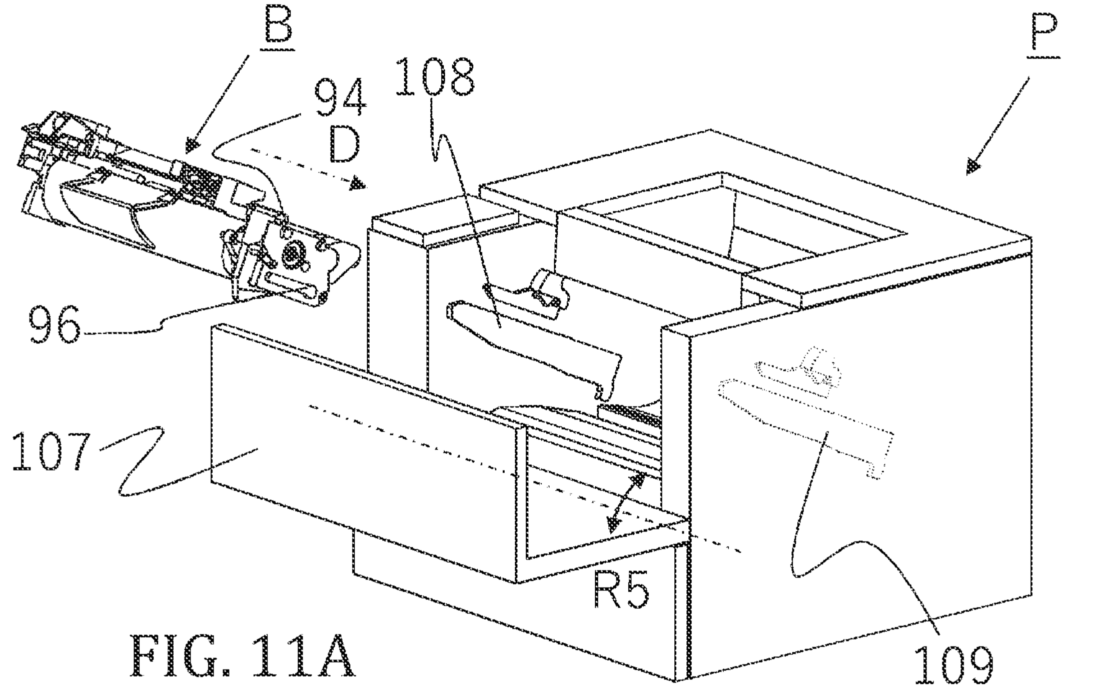
FIGS. 11A and 11B are schematic perspective views illustrating attachment of the process cartridge and the toner cartridge.
Figure 11B:
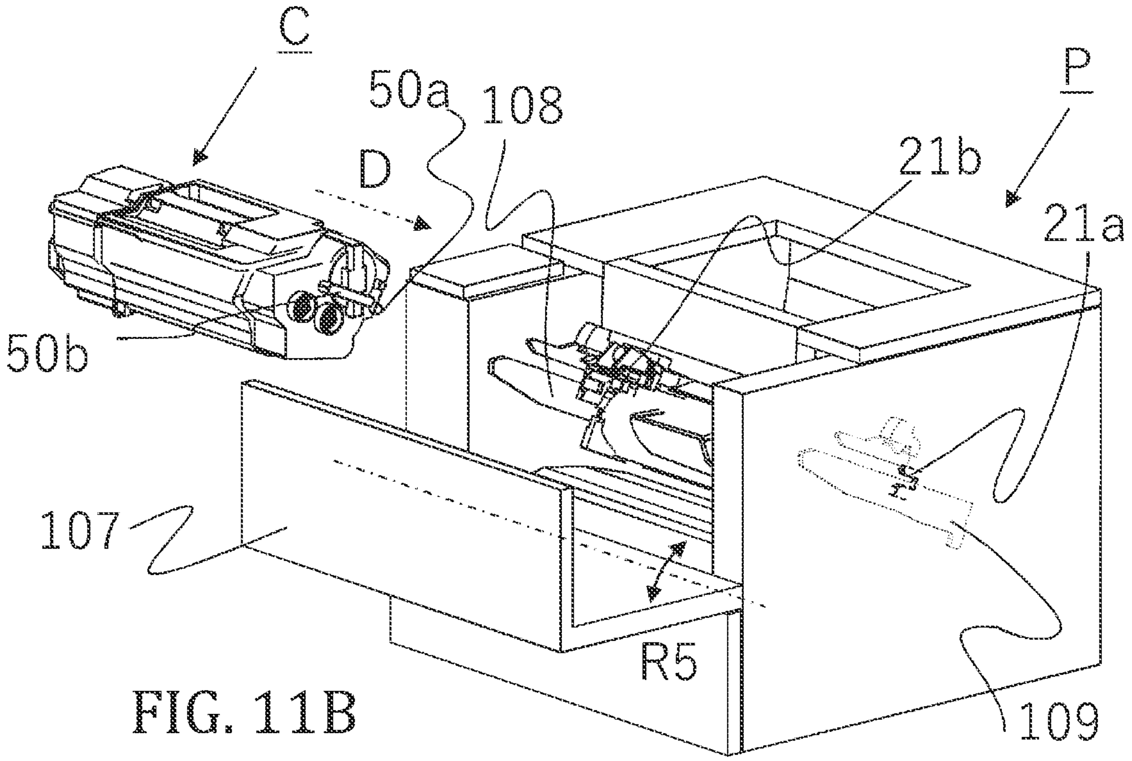
Figure 12A:
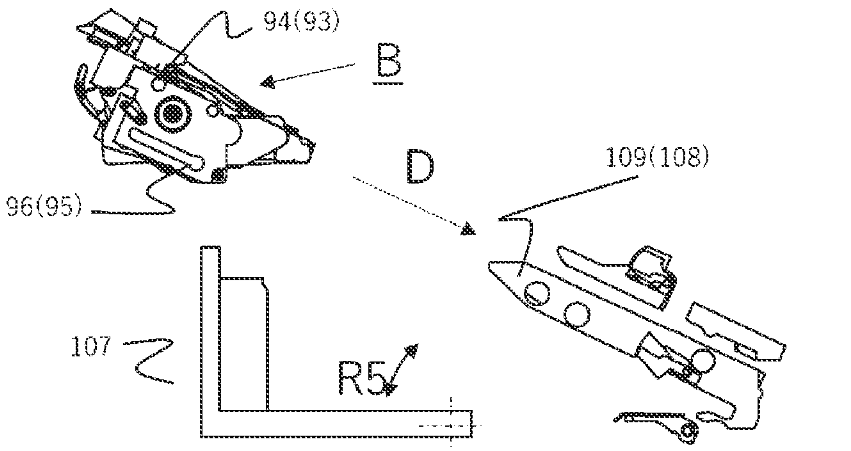
FIGS. 12A to 12C are schematic side views illustrating attachment of the process cartridge and the toner cartridge.
Figure 12B:
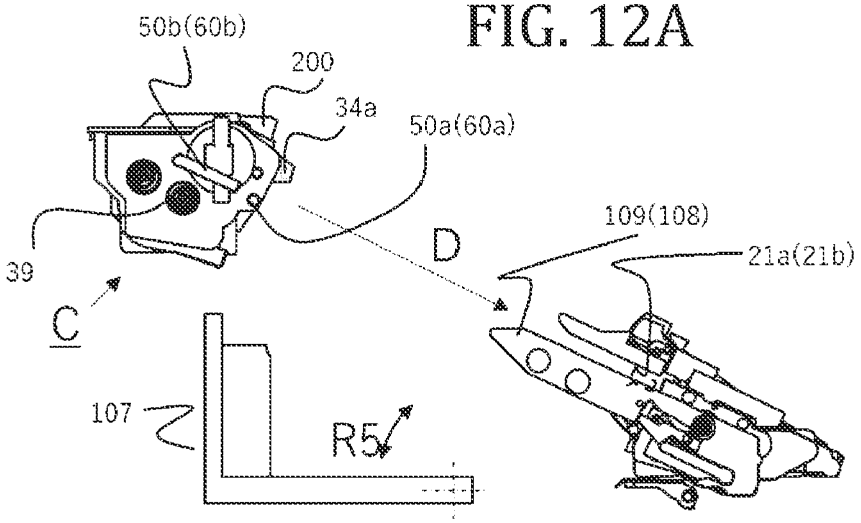
Figure 12C:
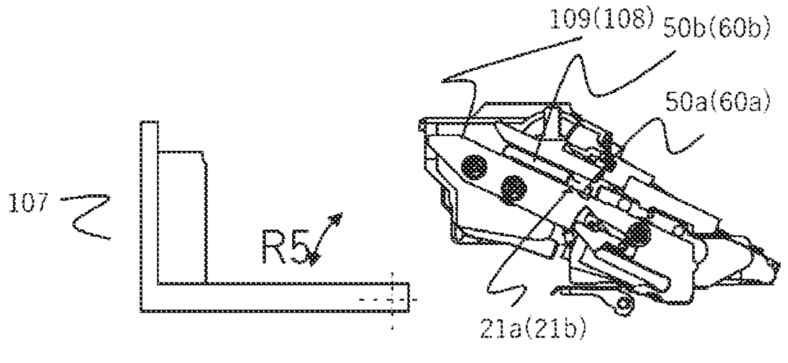

Subsequently, an attaching/detaching method of the process cartridge B, the toner cartridge C with respect to the printer main body P will be explained by using FIGS. 11A, 11B, and 12A to 12C. FIGS. 11A and 11B are schematic perspective views for explaining attachment of the process cartridge B, the toner cartridge C to the printer main body P. FIGS. 12A to 12C are schematic side views for explaining attachment of the process cartridge B, the toner cartridge C to the printer main body P.

As shown in FIG. 11A, a space inside the printer main body P is an attaching portion for the process cartridge B, the toner cartridge C. A door 107 capable of being opened/closed is provided rotatably around a rotation axis R5 with respect to the printer main body P, and FIG. 11A is a diagram of a state in which the door 107 is open.

Moreover, the printer main body P has a guide portion 108, a guide portion 109. In the process cartridge B, as shown in FIGS. 9A and 9B, an upper boss 93, an upper boss 94, a lower boss 95, and a lower boss 96 are provided on both right and left.

First, the process cartridge B is attached to the printer main body P. As shown in FIGS. 11A and 12A, by causing the upper boss 93 (FIG. 9B) and the lower boss 95 (FIG. 9B) to sandwich the guide portion 108 and by causing the upper boss 94 and the lower boss 96 to sandwich the guide portion 109, respectively, the process cartridge B inserted in an arrow direction D is attached to the printer main body P while being guided by the guide portions.

The toner cartridge C has, as shown in FIGS. 13A and 13B, a positioning boss 50*a* and a positioning boss 60*a* on the front in an attaching direction and guided portions 50*b*, 60*b* closer to a downstream side in the attaching direction than the positioning boss 50*a*, the positioning boss 60*a*. The process cartridge B has, as shown in FIGS. 9A and 9B, a positioning portion 21*a* and a positioning portion 21*b* on the stay 21.

As shown in FIGS. 11B and 12B, the guided portion 50*b*, the guided portion 60*b* are loaded on the guide portion 108, the guide portion 109, respectively, and inserted in the arrow direction D.

As shown in FIG. 12C, when the toner cartridge C has been attached to an insertion completion position, the positioning boss 50*a* and the positioning boss 60*a* (FIGS. 13A and 13B) enter the positioning portion 21*a* and the positioning portion 21*b* (FIGS. 9A and 9B), respectively. At this time, distal end sides in the insertion direction of the guided portion 50*b* and the guided portion 60*b* are separated from the guide portion 108 and the guide portion 109, respectively, and are brought into a state where rear ends are in contact with the guide portion 108 and the guide portion 109, respectively. Moreover, the toner cartridge C is positioned to the process cartridge B by the positioning boss 50*a* and the positioning boss 60*a*, and rotating direction components around the positioning boss 50*a* and the positioning boss 60*a* of the toner cartridge C are regulated by being positioned by rear ends of the guided portion 50*b* and the guided portion 60*b*, respectively. As a result, the toner cartridge C is positioned with respect to the process cartridge B. Moreover, the rear ends of the guided portion 50*b* and the guided portion 60*b* are brought into contact with the guide portion 108 and the guide portion 109 and thus, the position of the toner cartridge B in the printer main body P is determined.

When the door 107 is closed after the process cartridge B and the toner cartridge C are inserted into the printer main body P, a state where an image can be formed is brought about. An operation of removing the toner cartridge C, the process cartridge B is performed with a procedure opposite to the above.

Toner Replenishing Path of Process Cartridge B

Figure 14:
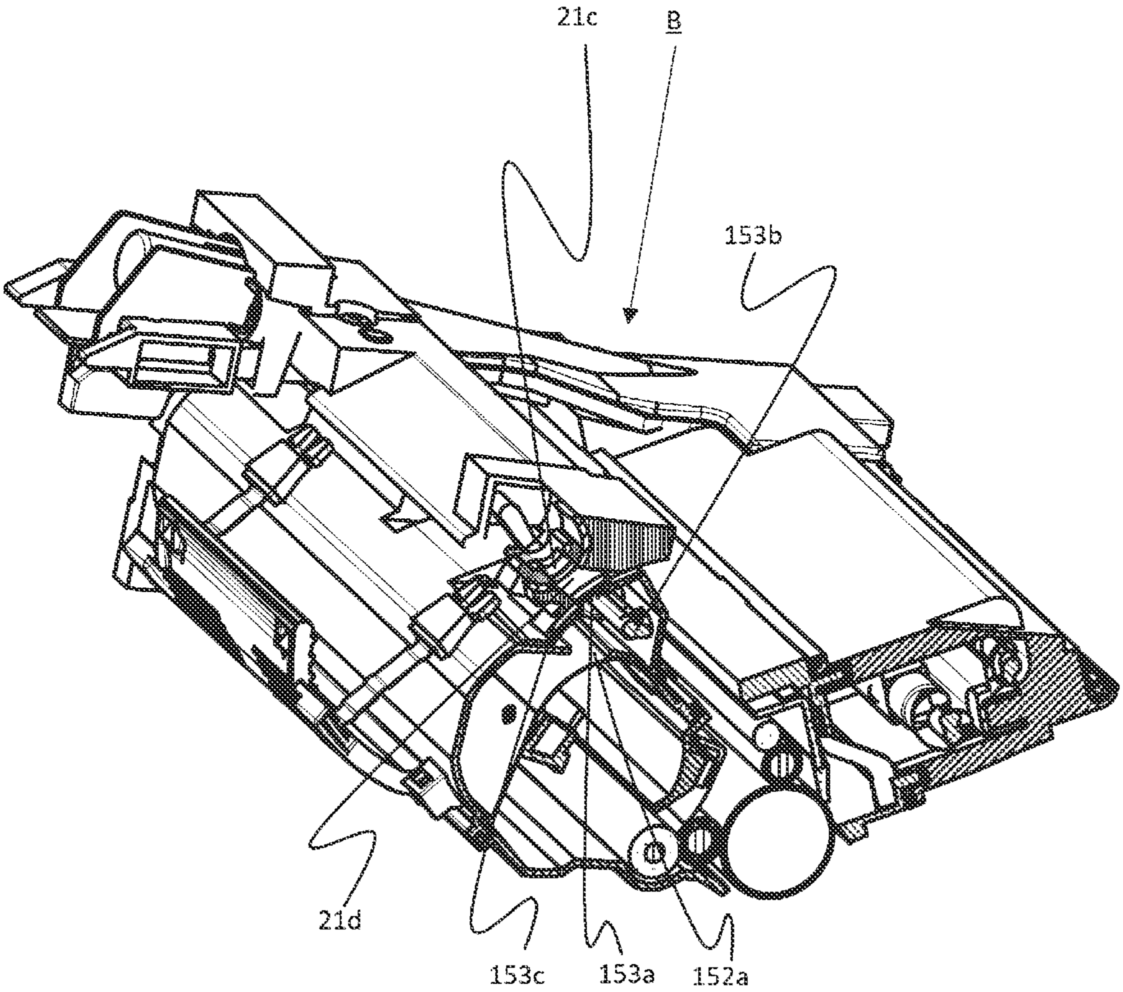
FIG. 14 is a sectional perspective view illustrating a replenishing port of the process cartridge.
Figure 15A:
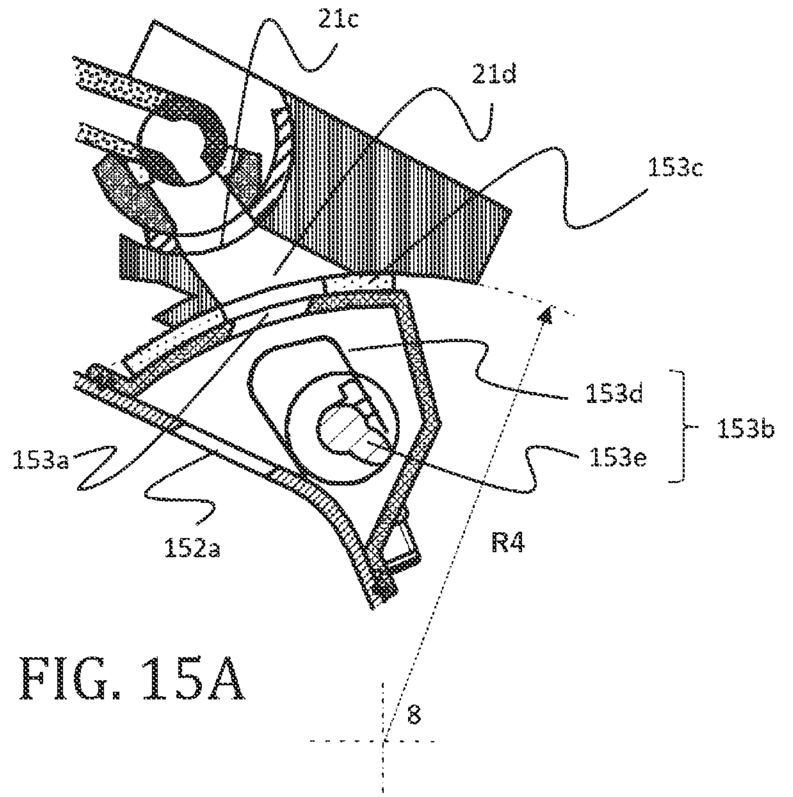
FIGS. 15A and 15B are schematic sectional views illustrating a relationship between a toner accepting chamber and a stay at contact and separation positions.

Subsequently, a toner replenishing path of the process cartridge B will be explained by using FIGS. 14, 15A, and 15B. FIG. 14 is a sectional perspective view illustrating a replenishing port of the process cartridge B. FIG. 15A is a schematic sectional view for explaining a disposition relationship of the toner accepting chamber 153 and the stay 21 when the development unit 15 is positioned at the contact position with respect to the photosensitive drum 11. Moreover, FIG. 15B is a schematic sectional view illustrating the disposition relationship of the toner accepting chamber 153 and the stay 21 when the development unit 15 is positioned at the separation position with respect to the photosensitive drum 11.

As described above, the process cartridge B receives toner replenishment from the toner cartridge C. Specifically, as shown in FIGS. 14, 15A, and 15B, the replenishing port 21*c* for accepting the toner conveyed from the toner cartridge C is provided in the stay 21. The toner accepted at the replenishing port 21*c* is conveyed from an accepting port 153*a* of the development unit 15 to the toner accepting chamber 153 through the delivery port 21*d*. The toner replenished to the toner accepting chamber 153 is replenished by a conveyance member 153*b* to the developer accommodating chamber 152 (FIG. 5) from an accepting port 152*a* provided in the developer accommodating chamber 152. A seal member 153*c* is bonded to a periphery of the accepting port 153*a*, and the seal member 153*c* seals a space between the delivery port 21*d* and the accepting port 153*a*.

As shown in FIG. 15A, shapes of the periphery of the accepting port 153*a* of the toner accepting chamber 153 and the periphery of the delivery port of the stay 21 have arc shapes R4 around the swing axis 8 of the development unit 15 described above.

Figure 15B:
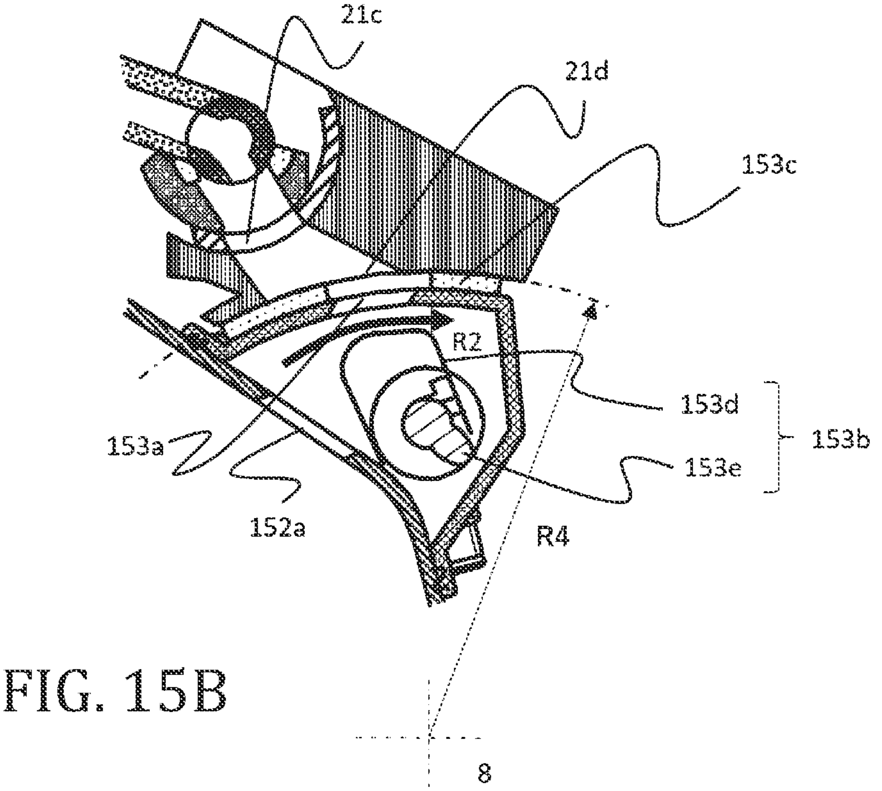

As shown in FIG. 15B, even if the development unit 15 moves to the separation position, since the replenishing port 21*c* for accepting the toner from the toner cartridge C is provided in the stay 21, the position does not change. Moreover, a crush amount of the seal member 153*c* accompanying movement of the development unit 15 rarely changes, but stable sealing performance can be ensured regardless of the position of the development unit 15. Furthermore, even in a state where the development unit 15 is positioned at the separation position, the accepting port 153*a* is configured to have such a size that parts of the delivery port 21*d* and the accepting port 153*a* can communicate. As a result, the toner can be accepted whichever position of the contact position (first position) and the separation position (second position) the development unit 15 is located.

As shown in this Embodiment, the accepting port 153*a* may be configured to completely communicate with the delivery port 21*d* or may have a configuration of communication at least a part thereof.

Configuration of Toner Accepting Chamber of Development Unit

Figure 16:
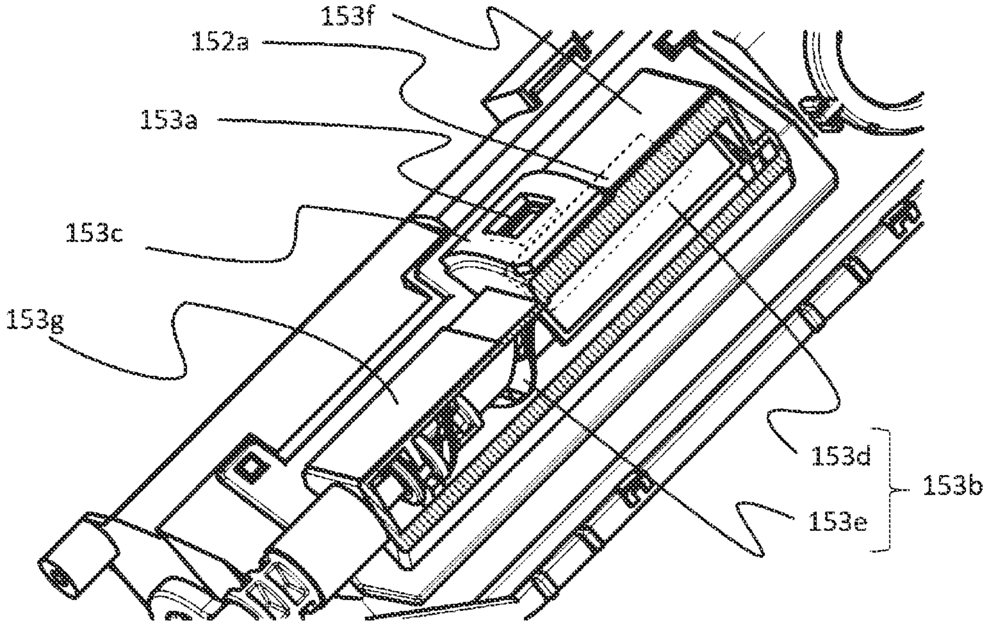
FIG. 16 is a schematic perspective view of the toner accepting chamber of the process cartridge.

The toner accepting chamber 153 of the development unit 15 will be explained by using FIG. 16. FIG. 16 is a schematic perspective view of the toner accepting chamber 153 of the process cartridge B.

The toner cartridge C replenishes the toner to the process cartridge B by using the pump 37*a* as described above. That is, the toner replenished to the process cartridge B is replenished in a state of being mixed with air. Thus, as shown in FIG. 16, the toner accepting chamber 153 has a downstream-side filter 153*f* and an upstream-side filter 153*g*, which are filter members for extracting air.

Moreover, the conveyance member 153*b* which conveys the toner replenished into the toner accepting chamber 153 to the accepting port 152*a* is provided. The conveyance member 153*b* has a sheet member 153*d* which conveys the toner fallen from the accepting port 153*a* to the accepting port 152*a* and a spiral portion 153*e* having a shape for returning the toner from the accepting port 153*a* in a direction of the accepting port 152*a*.

Regarding the filter member, the upstream-side filter 153*g* disposed on an upstream side in a conveyance direction of the spiral portion 153*e* and the downstream-side filter 153*f* disposed on an upper part of the sheet member 153*d* are disposed closer to an upper side in the gravity direction than the spiral portion 153*e*, respectively.

The toner replenished from the accepting port 153*a* is conveyed by the spiral portion 153*e* and the sheet member 153*d* to the accepting port 152*a* side. That is, regarding a surface opposed to a region where the toner is conveyed by the spiral portion 153*e*, which is a lower surface of the upstream-side filter 153*g*, since the spiral portion 153*e* is not filled with the toner due to sequential conveyance of the toner, air can be extracted stably. The downstream-side filter 153*f* is preferably disposed at least partially closer to the upper side in the gravity direction than the accepting port 153*a*. As a result, air can be extracted more efficiently when the toner is replenished to the accepting port 153*a*.

Waste-Toner Conveyance Configuration Provided on Cleaning Unit 10

Figure 17:
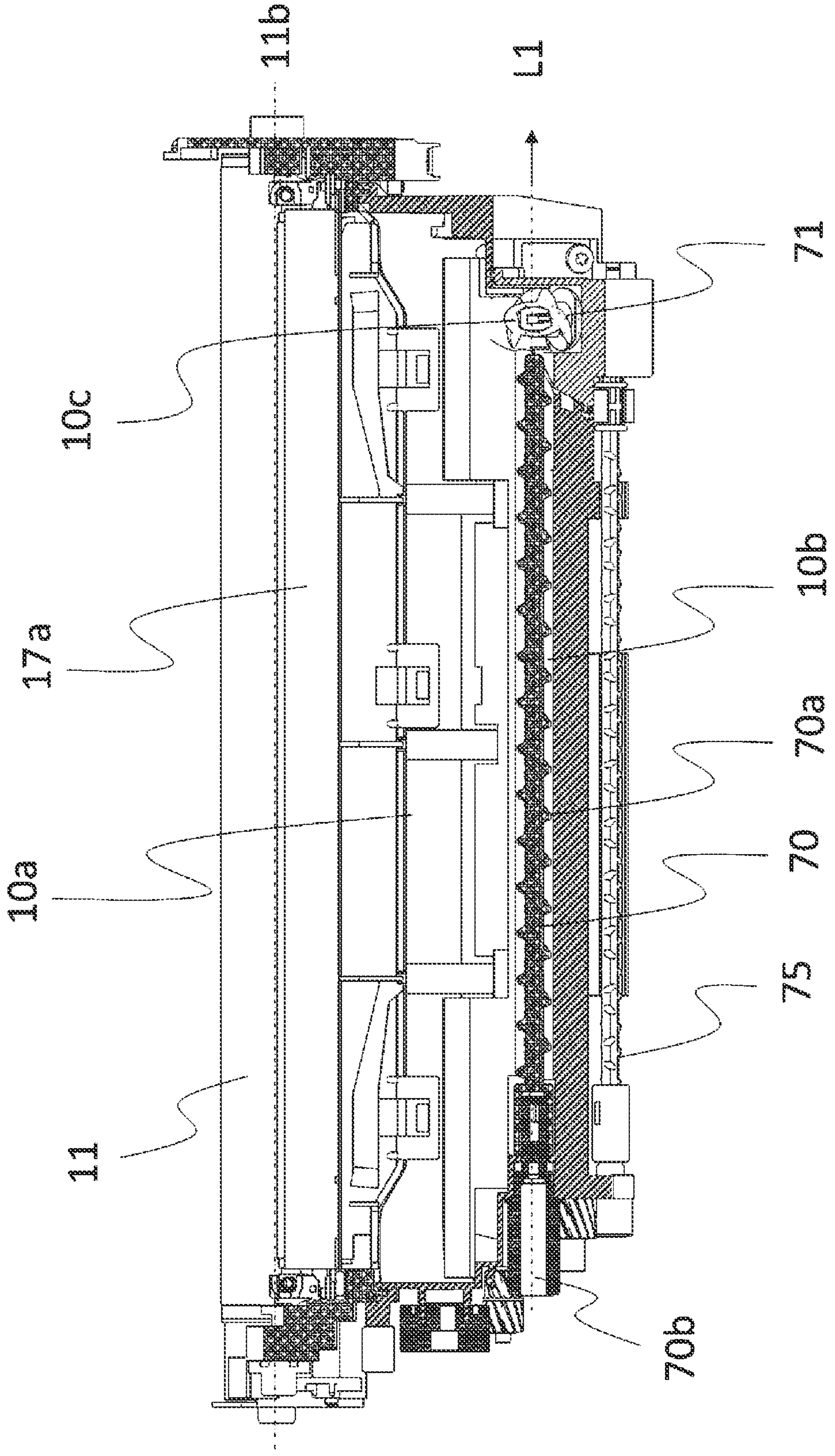
FIG. 17 is a schematic sectional view when a cleaning unit is seen from an upper surface.
Figure 18:
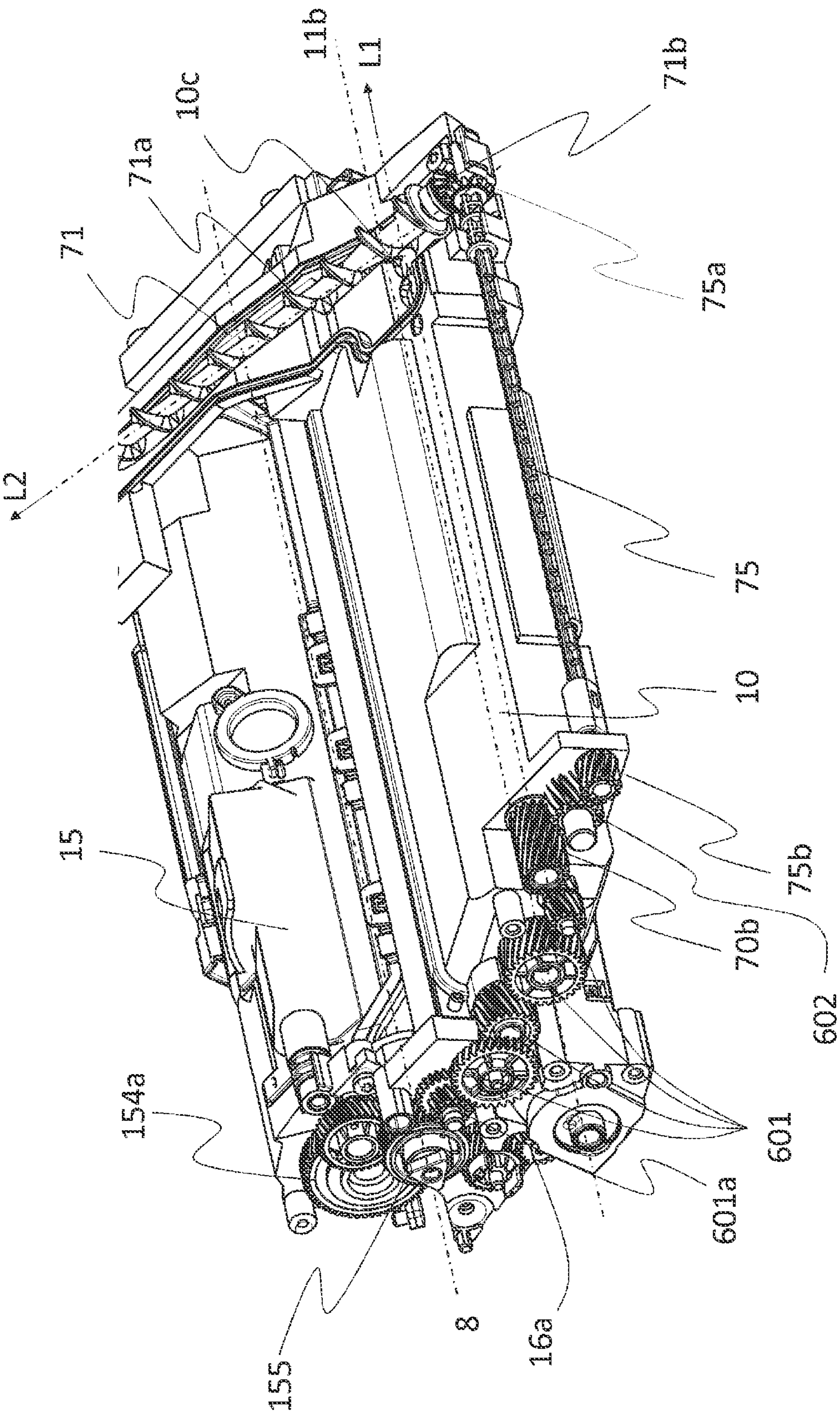
FIG. 18 is a schematic perspective view of a drive row of the process cartridge.

A waste-toner conveyance configuration provided on the cleaning unit 10 will be explained by using FIGS. 3, 4, 17, 18, and 23. FIG. 17 is a schematic sectional view when the cleaning unit 10 is seen from an upper surface. FIG. 18 is a schematic perspective view of the process cartridge B illustrating the drive configuration of the first conveyance member 70. Note that FIG. 18 is shown by excluding the side cover 7 and the bearing member 5 from the process cartridge B for explanation. Moreover, FIG. 23 is a schematic sectional view for explaining a positional relationship of the cleaning blade 17 and the second toner conveyance path 10*c*.

As described above, the waste toner removed by the cleaning blade 17 from the photosensitive drum 11 is recovered in the waste-toner accommodating portion 10*a* as a developer recovering portion.

In the waste-toner accommodating portion 10*a*, as shown in FIGS. 3 and 17, the first conveyance member 70 is disposed with a rotation axis L1 substantially in parallel with the rotation axis 11*b* of the photosensitive drum 11. When the waste toner accumulates in the waste-toner accommodating portion 10*a*, the waste toner is sent out to the first toner conveyance path 10*b*. As shown in FIGS. 4 and 18, a second conveyance member 71 is provided on the second toner conveyance path 10*c* disposed by crossing the rotation axis 11*b* of the photosensitive drum 11 (typically at a right angle). That is, the second conveyance member 71 conveys the toner in a direction different from that of the first conveyance member 70 (crossing direction). Here, the second conveyance member 71 conveys the toner upward from below an upper end of the cleaning blade with respect to the gravity direction.

Figure 23:
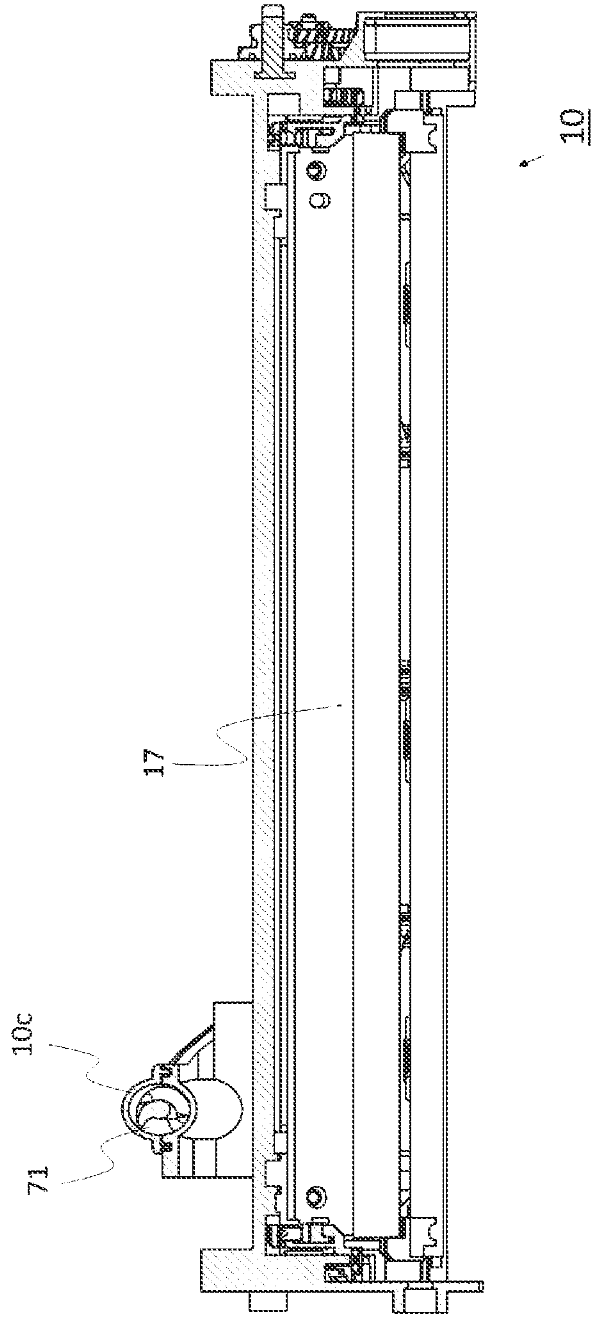
FIG. 23 is a schematic sectional view for explaining a positional relationship between the cleaning blade and the second conveyance path.

In this Embodiment, the second toner conveyance path 10*c* and the second conveyance member 71 are disposed on an inner side from an end part of the cleaning blade 17 in a direction (longitudinal direction) of the rotation axis 11*b* of the photosensitive drum 11 as shown in FIG. 23. Here, the "inner side from the end part" more specifically means the inner side from the end part of the blade portion 17*a* in the cleaning blade 17. Moreover, in the configuration of this Embodiment, the second toner conveyance path 10*c* and the second conveyance member 71 are disposed inside an end part of a development opening 151*a* in the longitudinal direction. Moreover, the second conveyance member 71 has an upstream end part and a downstream end part with respect to a conveyance direction of the developer, and the downstream end part is disposed above the upstream end part with respect to the gravity direction.

The waste toner having been sent to the first toner conveyance path 10*b* is conveyed by a spiral portion 70*a* provided in the first conveyance member 70 in the direction L1 substantially in parallel with the rotation axis direction of the photosensitive drum 11. Then, the waste toner conveyed by the first conveyance member 70 reaches the second toner conveyance path 10*c*.

Subsequently, the waste toner having reached the second toner conveyance path 10*c* is conveyed by a spiral portion 71*a* of the second conveyance member 71 as shown in FIGS. 4 and 18 in a direction L2 above the cleaning blade 17 and orthogonal to the rotation axis 11*b* of the photosensitive drum 11. Moreover, the waste toner having been conveyed to the end part of the second conveyance member 71 is discharged to the waste-toner accepting port 42*a* (FIGS. 13A and 13B) of the waste-toner recovering portion 40 from a waste-toner discharge port 72.

Here, in the image forming apparatus to which the process cartridge can be detachably attached, a size reduction of the process cartridge is in demand for the purposes of resource saving, reduction in manufacturing and conveyance costs, facilitation of handling and the like.

In this Embodiment, with respect to the longitudinal direction of the process cartridge B, the waste toner is conveyed by the configuration in which the second toner conveyance path 10*c* and the second conveyance member 71 are provided on the inner side of the end part of the cleaning blade 17. As a result, a length in the longitudinal direction of the process cartridge B can be made shorter. That is, the size of the process cartridge B in a direction of the rotation axis 11*b* of the photosensitive drum 11 can be reduced. Moreover, in order to make conveyance performance of the waste toner more stable, a pitch of the spiral portion 71*a* of the second conveyance member 71 may be made longer than a pitch (distance between adjacent spiral portions) of the spiral portion 70*a* of the first conveyance member 70. Similarly, in order to make the conveyance performance of the waste toner more stable, a diameter of the pitch of the spiral portion 71*a* may be made larger than a diameter of the pitch of the spiral portion 70*a*.

Drive Configuration of Waste-Toner Conveyance Member

The drive configurations of the first conveyance member 70, the second conveyance member 71 will be explained by using FIG. 18. FIG. 18 is a schematic perspective view of the process cartridge B illustrating the drive configuration of the waste-toner conveyance member. Note that it is an explanatory view excluding the side cover 7 and the bearing member 5 from the process cartridge B for explanation.

As shown in FIG. 18, in the cleaning unit 10, a first gear 70*b*, which is a gear for transmitting drive to the first conveyance member 70, and a second gear 71*b*, which is a bevel gear for transmitting the drive to the second conveyance member 71 are disposed. To the first gear 70*b*, the drive is transmitted from a development coupling 155 provided coaxially with the swing axis 8 through a gear train 601.

Moreover, the drive is transmitted to the second gear 71*b* from the first gear 70*b* through an idler gear 602, a drive gear 75*b* provided on a through shaft disposed on a drive side, a through shaft 75 disposed in parallel with the first conveyance member 70, and a bevel gear 75*a* provided on an end part on a non-drive side of the through shaft 75. As a result, the drive is transmitted to the first conveyance member 70, the second conveyance member 71, and the waste toner can be conveyed. Moreover, though the bevel gear is used in this Embodiment, the second gear 71*b* and the bevel gear 75*a* may be screw gears. Furthermore, in this Embodiment, rotation numbers of the first conveyance member 70 and the second conveyance member 71 are the same, but in order to improve conveyance efficiency, the rotation number of the second conveyance member 71 may be higher than that of the first conveyance member 70.

Embodiment 2

Subsequently. Embodiment 2 will be explained. For the same configuration as that in Embodiment 1, explanation will be simplified.

Waste-Toner Conveyance Configuration of Waste-Toner Accommodating Portion 10*a*

Figure 19:
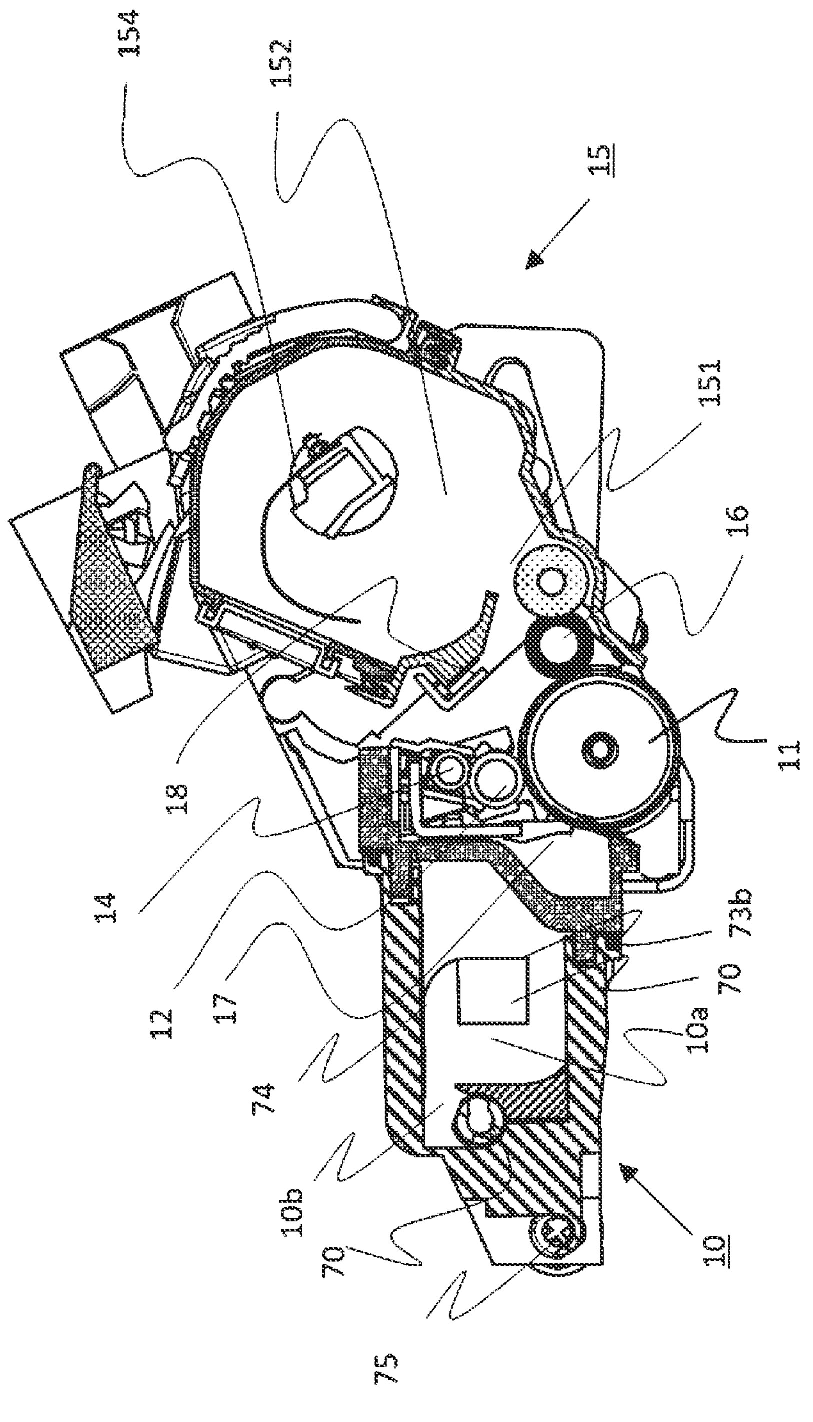
FIG. 19 is a sectional view illustrating an outline of a process cartridge in Embodiment 2.

A configuration which makes the waste-toner conveyance of the waste-toner accommodating portion 10*a* in Embodiment 1 more stable will be explained by using FIGS. 19, 20, and 21. FIG. 19 is a sectional view illustrating an outline of the process cartridge B in Embodiment 2, FIG. 20 is a sectional view illustrating the second toner conveyance path 10*c* of the process cartridge B in Embodiment 2, and FIG. 21 is a schematic sectional view when the cleaning unit 10 is seen from an upper surface.

Figure 20:
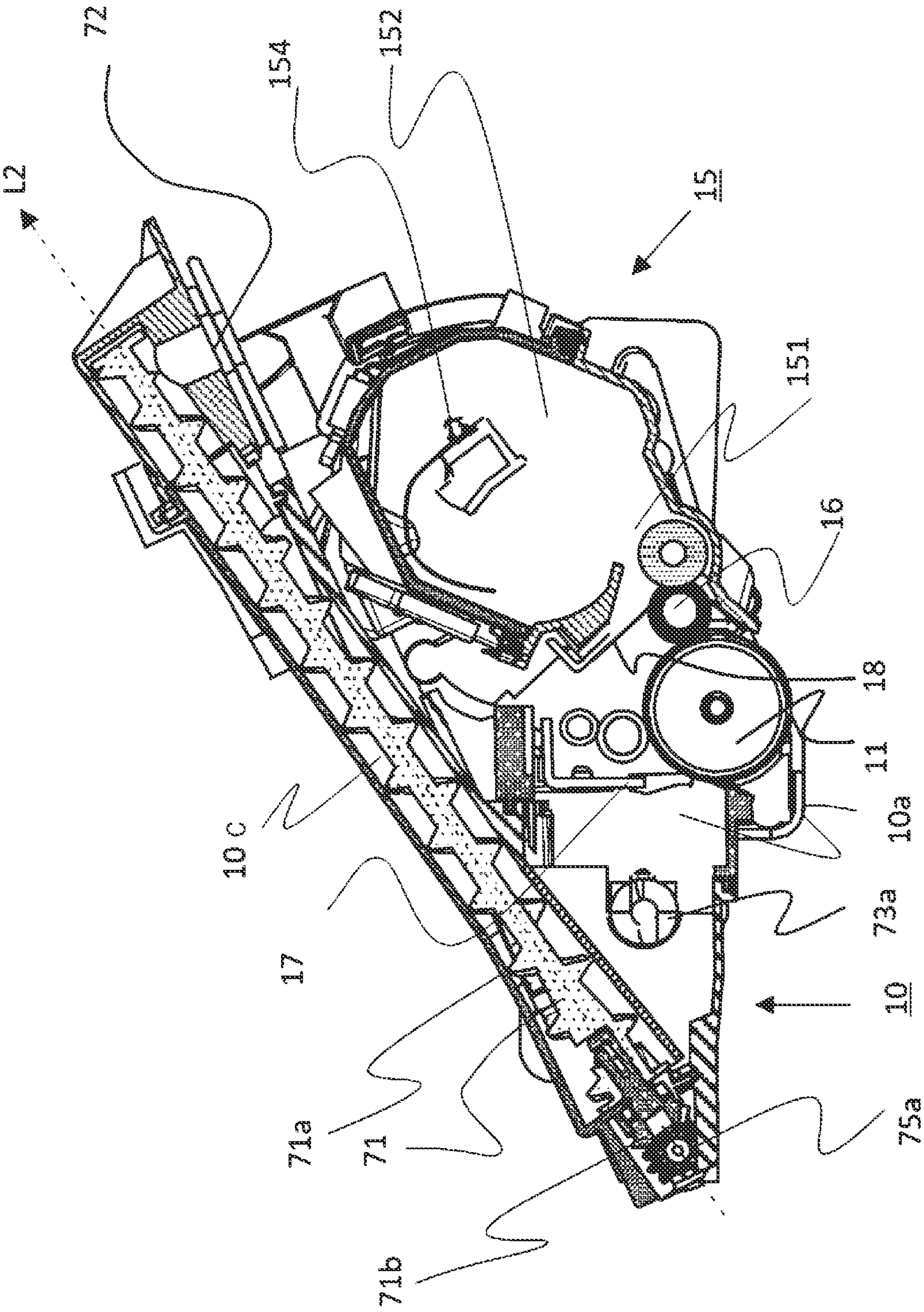
FIG. 20 is a sectional view illustrating a second toner conveyance path of the process cartridge in Embodiment 2.
Figure 21:
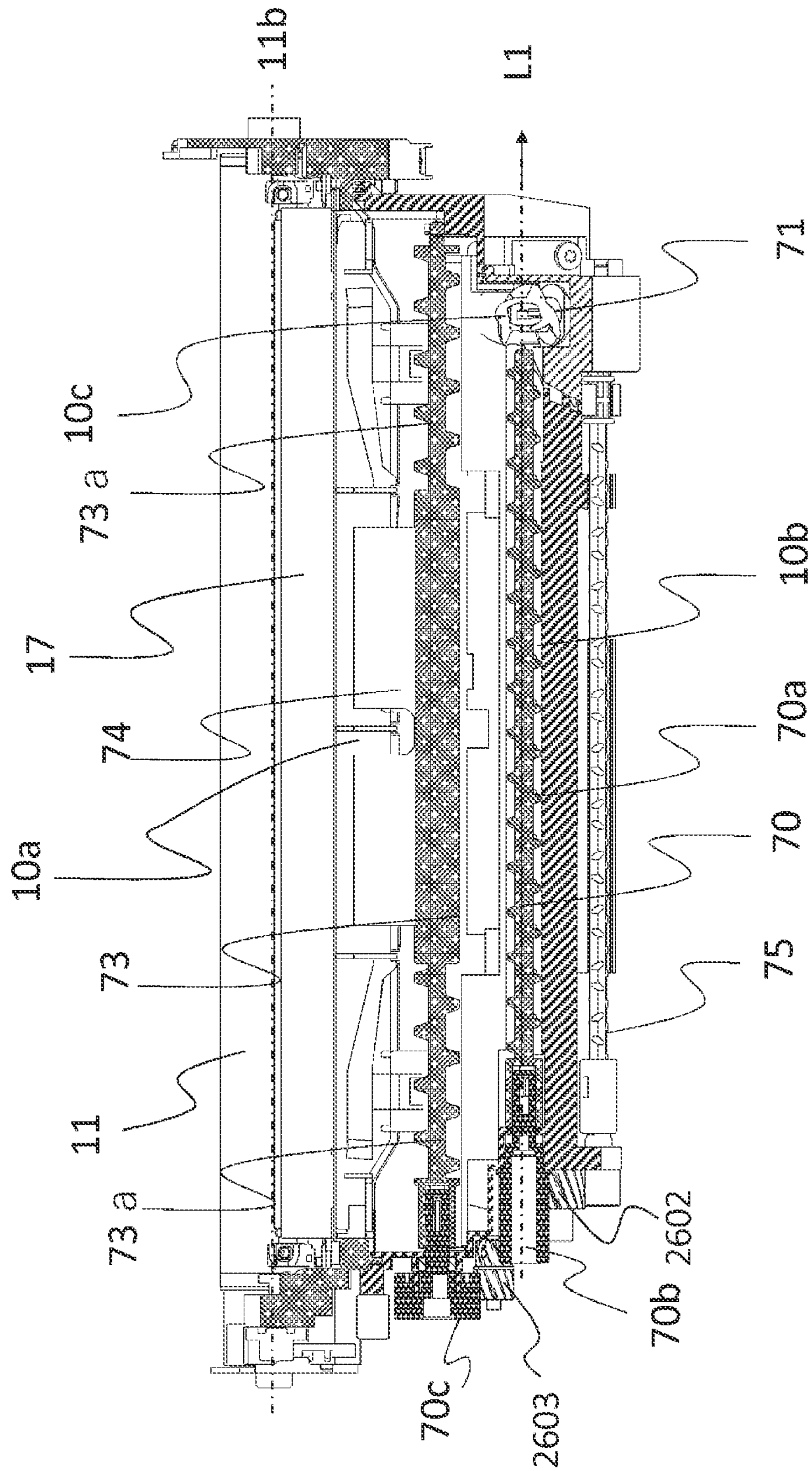
FIG. 21 is a schematic sectional view when the cleaning unit is seen from an upper surface.

As shown in FIGS. 19, 20, and 21, the waste-toner accommodating portion 10*a* has a third conveyance member 73 and a first sheet portion 74, and the third conveyance member 73 has a spiral portion 73*a* and a fixing portion 73*b* for fixing the first sheet portion 74.

As described above, the waste toner on the photosensitive drum 11 is recovered by the cleaning blade 17 in the waste-toner accommodating portion 10*a*. The recovered waste toner is conveyed by the spiral portion 73*a* of the third conveyance member 73 toward a center in the rotation axis

11*b* direction of the photosensitive drum 11. The waste toner having been conveyed to the center in the rotation axis 11*b* direction of the photosensitive drum 11 is conveyed by the first sheet portion 74 to the first toner conveyance path 10*b* provided in a direction orthogonal to the rotation axis 11*b* direction of the photosensitive drum 11.

The waste toner having reached the first toner conveyance path 10*b* is conveyed by the spiral portion 70*a* provided in the first conveyance member 70 in the rotation axis 11*b* direction of the photosensitive drum 11. Subsequently, the waste toner having been conveyed by the first conveyance member 70 reaches the second toner conveyance path 10*c*. The waste toner having reached the second toner conveyance path 10*c* is conveyed by the spiral portion 71*a* of the second conveyance member 71 in a direction above the cleaning blade 17 and orthogonal to the rotation axis 11*b* of the photosensitive drum 11.

Moreover, the waste toner conveyed to the end part of the second conveyance member 71 is discharged to the waste-toner accepting port 42*a* (FIG. 13A) of the waste-toner recovering portion 40 from the waste-toner discharge port 72. By conveying the waste toner in the configuration as above, collection of the waste toner in the waste-toner accommodating portion 10*a* (particularly the second toner conveyance path 10*c* in the rotation axis 11*b* direction of the photosensitive drum 11) can be prevented, and stable conveyance of the waste toner is made possible. Moreover, a drive load can be also reduced.

Subsequently, another configuration of the configuration of the conveyance by the spiral portion 73*a* of the third conveyance member 73 toward the center in the rotation axis 11*b* direction of the photosensitive drum 11 described above will be explained by FIGS. 28, 29, 30A, and 30B.

Figure 28:
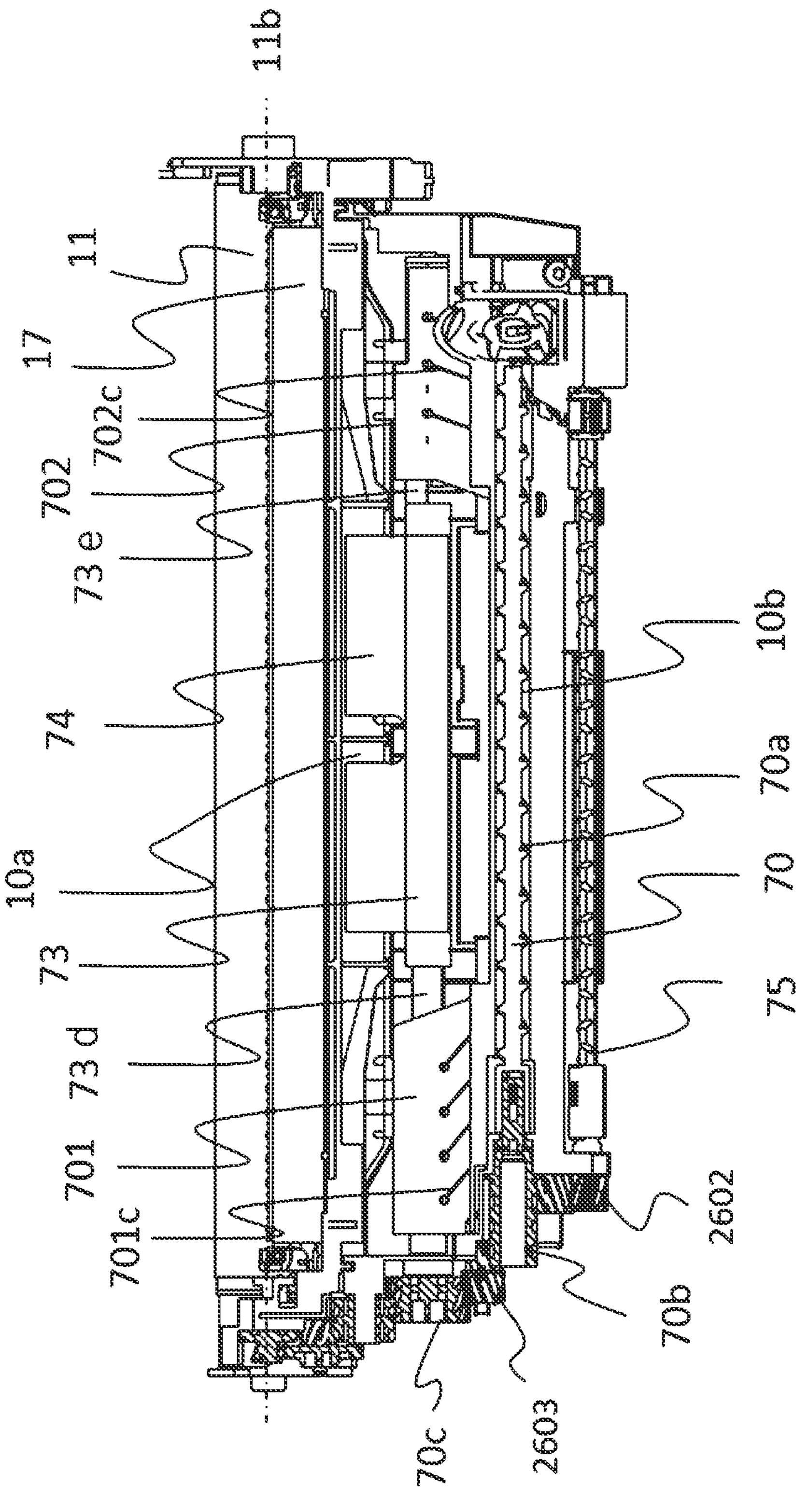
FIG. 28 is a schematic sectional view illustrating another configuration for conveyance.
Figure 29:
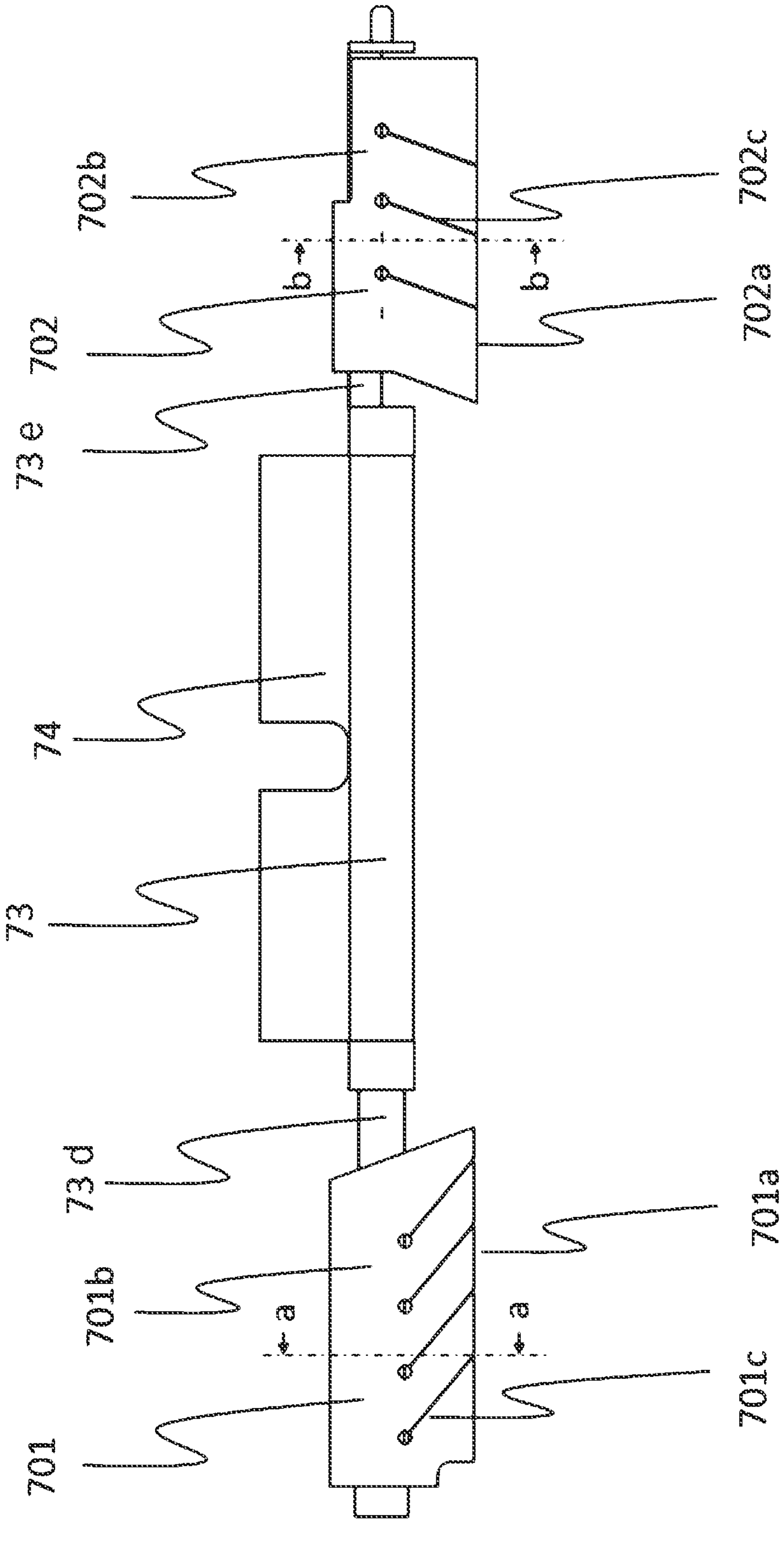
FIG. 29 is a front view of the conveyance member with another configuration for the conveyance.
Figure 30A:
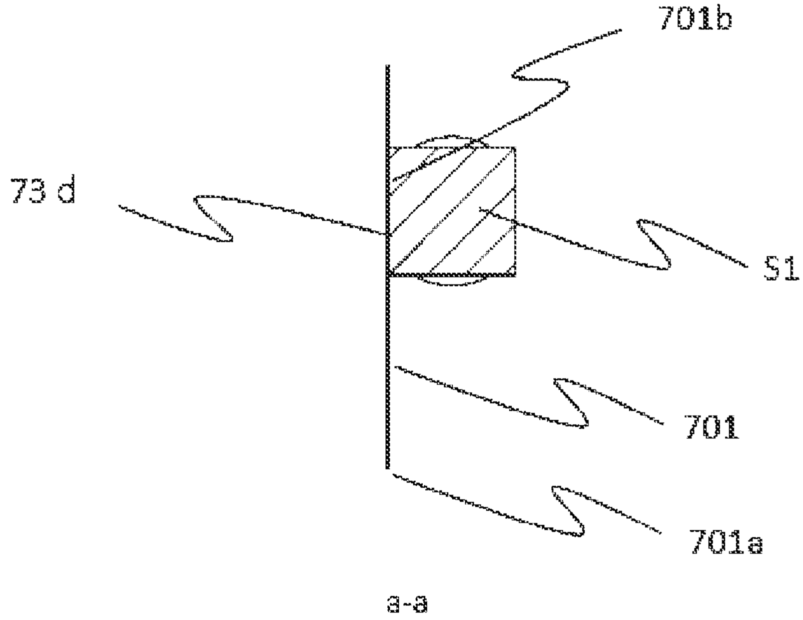
FIGS. 30A and 30B are sectional views of a third conveyance member with another configuration for the conveyance.
Figure 30B:
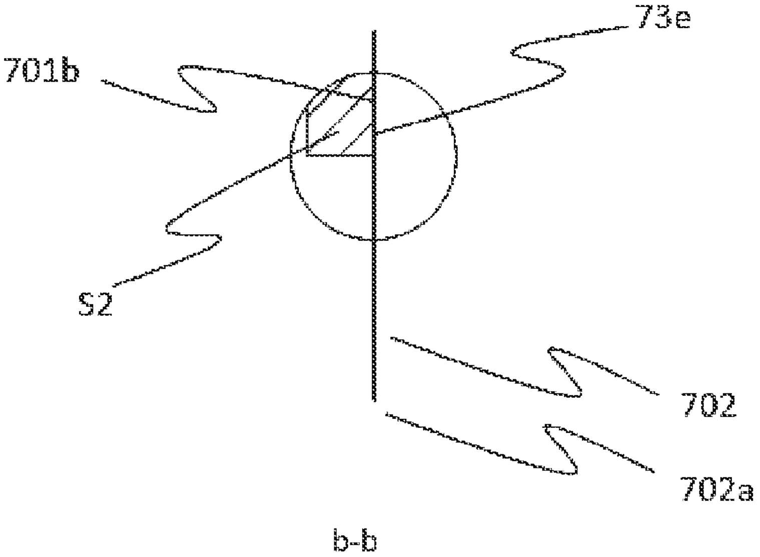

FIG. 28 is a schematic sectional view of the cleaning unit 10 when seen from the upper surface, FIG. 29 is a front view of the third conveyance member 73 unit, and FIGS. 30A and 30B are sectional views of the third conveyance member 73 unit. FIG. 30A shows an a-a section of FIG. 29, and FIG. 30B for a b-b section.

As shown in FIGS. 28 and 29, a fixing portion 73*d*, a fixing portion 73*e* are provided for fixing the second sheet portion 701 and the third sheet portion 702 on both end parts of the third conveyance member 73. The second sheet portion 701 and the third sheet portion 702 have slits 701*c*, 702*c* from free ends 701*a*, 702*a* toward fixed ends 701*b*, 702*b*. Explanation on the slits 701*c*, 702*c*, which will be described later, will be made for the second sheet portion 701, since they have symmetrical shapes. The slit 701*c* from the fixed end 701*b* toward the free end 701*a* of the second sheet portion 701 is inclined from the end part in the rotation axis 11*b* direction of the photosensitive drum 11 toward the center. By means of the drive configuration described later, when the third conveyance member 73 is rotated, the waste toner recovered in the waste-toner accommodating portion 10*a* can be conveyed by the second sheet portion 701 and the third sheet portion 702 toward the center in the rotation axis 11*b* direction of the photosensitive drum 11. The toner can be conveyed in a state where density of the waste toner of the waste-toner accommodating portion 10*a* is lower than that in the configuration of the spiral portion 73*a*.

Moreover, as shown in FIGS. 28, 29, 30A, and 30B, a relationship between a sectional area S1 of the fixing portion 73*d* of the third conveyance member 73 and a sectional area S2 of the fixing portion 73*e* is set to S1>S2. Since S1 is on a drive input side, distortion of the third conveyance member 73 can be prevented, and the waste toner can be conveyed stably. Moreover, since the sectional areas are in the relationship of S1>S2, free lengths of the second sheet portion 701 and the third sheet portion 702 are different. By changing angles of the slits 701*c*, 702*c*, rigidity of the second sheet portion 701 and the third sheet portion 702 are made equal. As a result, the conveyance force of the waste toner in the rotation axis 11*b* direction of the photosensitive drum 11 can be made equal, and the waste toner can be conveyed stably.

Moreover, as shown in FIGS. 28 and 29, a fixed phase of the first waste-toner conveyance sheet 74 with respect to the third conveyance member 73 is shifted from the fixed phases of the second sheet portion 701, the third sheet portion 702. As a result, the waste toner conveyed by the second sheet portion 701 and the third sheet portion 702 toward the center in the rotation axis 11*b* direction of the photosensitive drum 11 can be efficiently conveyed by the first waste-toner conveyance sheet 74 to the first toner conveyance path 10*b*.

Drive Configuration of Waste-Toner Conveyance Member

Figure 22:
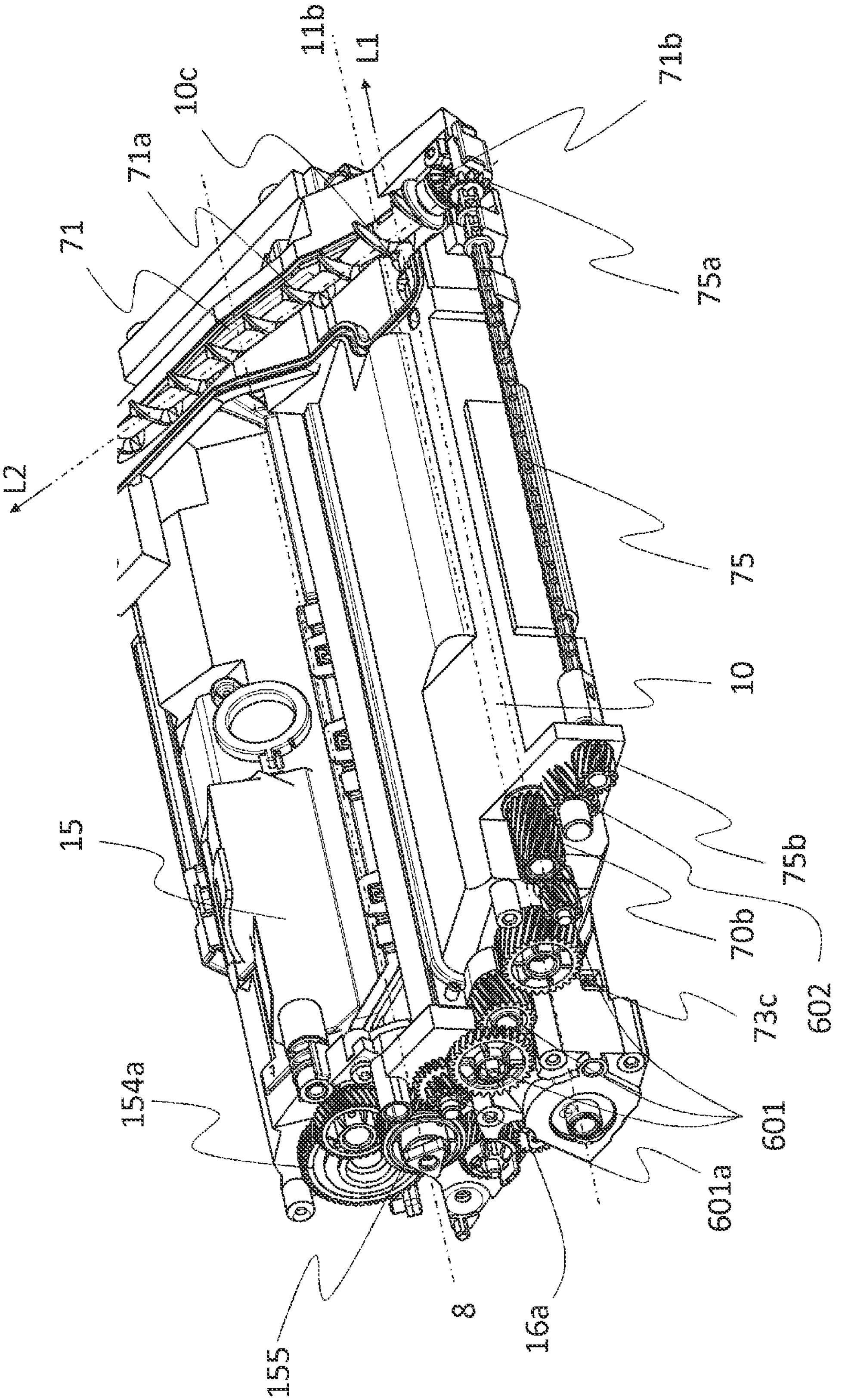
FIG. 22 is a schematic perspective view of the drive row of the process cartridge.

The drive configuration of the third conveyance member 73 will be explained by using FIG. 22. FIG. 22 is a schematic perspective view of the process cartridge B illustrating the drive configuration of the waste-toner conveyance member.

As shown in FIG. 22, in the cleaning unit 10, a third gear 73*c*, which is a gear which transmits drive to the third conveyance member 73 is disposed. To the third gear 73*c*, the drive is transmitted from the development coupling 155 provided coaxially with the swing axis 8 through the gear train 601. Similarly, to the first gear 70*b*, the drive is transmitted from the third gear 73*c* through an intermediate gear 603. Moreover, to the second gear 71*b*, the drive is transmitted from the first gear 70*b* through the idler gear 602, the drive gear 75*b*, the through shaft 75 disposed in parallel with the first conveyance member 70, and the bevel gear 75*a* provided at the end part of the through shaft 75. As a result, the drive is transmitted to the first conveyance member 70, the second conveyance member 71, the third conveyance member 73, and the waste toner can be conveyed.

Embodiment 3

Subsequently, Embodiment 3 will be explained. For the same configuration as those in Embodiments above, explanation will be simplified.

Figure 24:
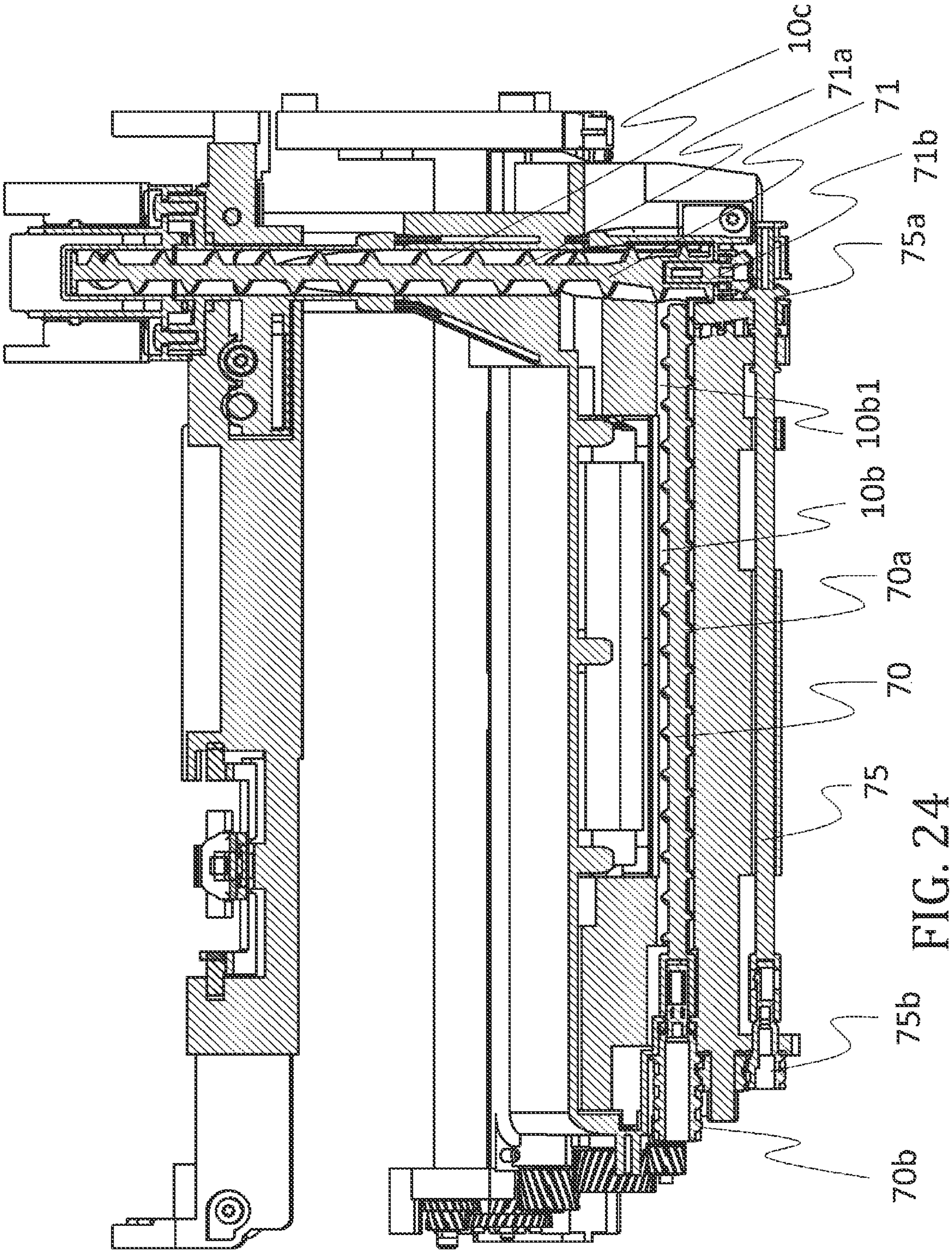
FIG. 24 is a schematic sectional view of a positional relationship between a first conveyance member and a second conveyance member.
Figure 25:
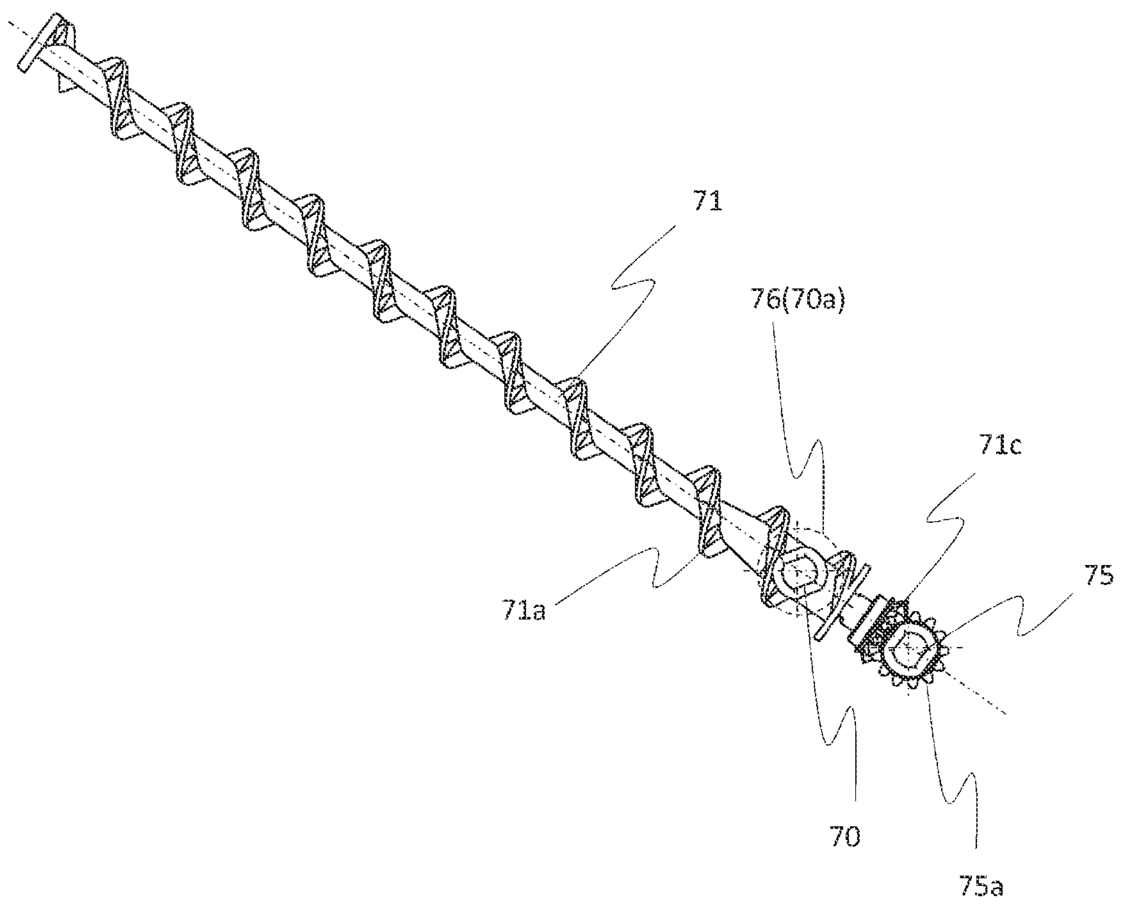
FIG. 25 is a schematic sectional view passing through axes of the first conveyance member and the second conveyance member.

FIG. 24 is a schematic sectional view illustrating a positional relationship of the first conveyance member 70 and the second conveyance member 71. FIG. 25 is a schematic sectional view passing through axes of the first conveyance member 70 and the second conveyance member 71. FIG. 25 illustrates a state of the first conveyance member 70 when seen from one side in the longitudinal direction.

Here, as described above, the second conveyance member 71 needs to convey the waste toner against the gravity direction. However, the waste toner having dripped down from a gap between the second toner conveyance path 10*c* and the spiral portion 71*a* of the second conveyance member 71 backflows through the second toner conveyance path 10*c* to the upstream side in the waste-toner conveyance direction of the second conveyance member 71, that is, toward the lower side in the gravity direction and thus, a flow in a direction opposite to the L2 direction (FIG. 22) is generated. The backflowing waste toner reaches the first toner conveyance path 10*b* via the second toner conveyance path 10*c* and is pushed back again by the first conveyance member 70 to the side of the second conveyance member 71. Thus, the first conveyance member 70 preferably has such configuration of continuously pushing the waste toner in the first toner conveyance path 10*b* into the second toner conveyance path 10*c*. That is, when the waste toner conveyed by the spiral portion 70*a* of the first conveyance member 70 is to be sent out toward the spiral portion 71*a* of the second conveyance member 71, it is preferable that a stable powder pressure is continuously applied.

In this Embodiment, as shown in FIGS. 24 and 25, an axial-direction projected surface 76 of the spiral portion 70*a* in the first conveyance member 70 is disposed so as to overlap the spiral portion 71*a* of the second conveyance member 71. Moreover, in order to prevent contact between the first conveyance member 70 and the second conveyance member 71, the first conveyance member 70 is disposed with a gap from an outer surface of the spiral portion 71*a* in the second conveyance member 71. Furthermore, a crossing portion 10*bi* with the second toner conveyance path 10*c* has a tunnel shape surrounding the whole outer peripheral surface of the spiral portion 70*a* of the first conveyance member 70.

By having the configuration as above, the powder pressure of the waste toner conveyed by the spiral portion 70*a* can be continuously applied to the spiral portion 71*a* stably. Moreover, even if the insides of the first toner conveyance path 10*b* and the second toner conveyance path 10*c* are filled with the waste toner, the spiral portion 70*a* and the spiral portion 71*a* are configured such that a conveyance amount of the second conveyance member 71 is larger than that of the first conveyance member 70 so that the waste toner does not stagnate. As described above, it is configured such that a load rise for the first conveyance member 70 to push back the backflow waste toner is suppressed even when the waste toner backflows, and a drive-force rise of the first conveyance member 70, which is a conveyance force of the waste toner, can be suppressed.

In this Embodiment, as shown in FIGS. 24 and 25, it is configured such that the axes of the first conveyance member 70 and the second conveyance member 71 are on the same plane, but the axes do not have to be on the same plane. In this case, by configuring such that the axial-direction projected surface of the spiral portion 70*a* of the first conveyance member 70 overlaps a part of the second conveyance member 71 and by disposing the first conveyance member 70 closer to the upper side in the gravity direction of the second conveyance member 71, the backflow toner intruding into the first toner conveyance path 10*b* can be suppressed.

Regarding the drive configuration of the waste-toner conveyance member explained by referring to FIG. 18, in this Embodiment, the through shaft 75 is exposed to an outside of the cleaning unit 10 and is provided on an opposite side from the photosensitive drum 11 through the waste-toner accommodating portion 10*a*. It is configured such that the drive transmitting members of the first conveyance member 70 and the second conveyance member 71 are disposed outside the waste-toner accommodating portion 10*a*, the first toner conveyance path 10*b*, and the second toner conveyance path 10*c* so that the waste toner does not adhere to the drive transmitting member. By having the configuration as above, reduction of drive transmission efficiency is suppressed, the drive-force rise of the waste-toner conveyance is suppressed, and a stable waste-toner conveyance configuration is realized. In this Embodiment, the drive transmitting member is provided by being exposed to the outside of the process cartridge B.

Embodiment 4

Subsequently, Embodiment 4 will be explained. For the same configuration as those in the Embodiments above, explanation will be simplified. Particularly in this Embodiment, the drive configuration of the waste-toner conveyance member will be explained by using FIGS. 9, 26, and 27. Here, in the present invention, the cleaning unit 10 is supported capable of swing with respect to the development unit 15, and in the configuration of contact and separation, the rotatable waste-toner conveyance member is disposed in the cleaning unit 10. In this configuration, as described above, such a configuration is in demand that a rotary force is stably transmitted by the waste-toner conveyance member, even if the cleaning unit 10 is rotated with respect to the development unit 15 and goes back and forth between the contact state and the separation state.

Figure 27:
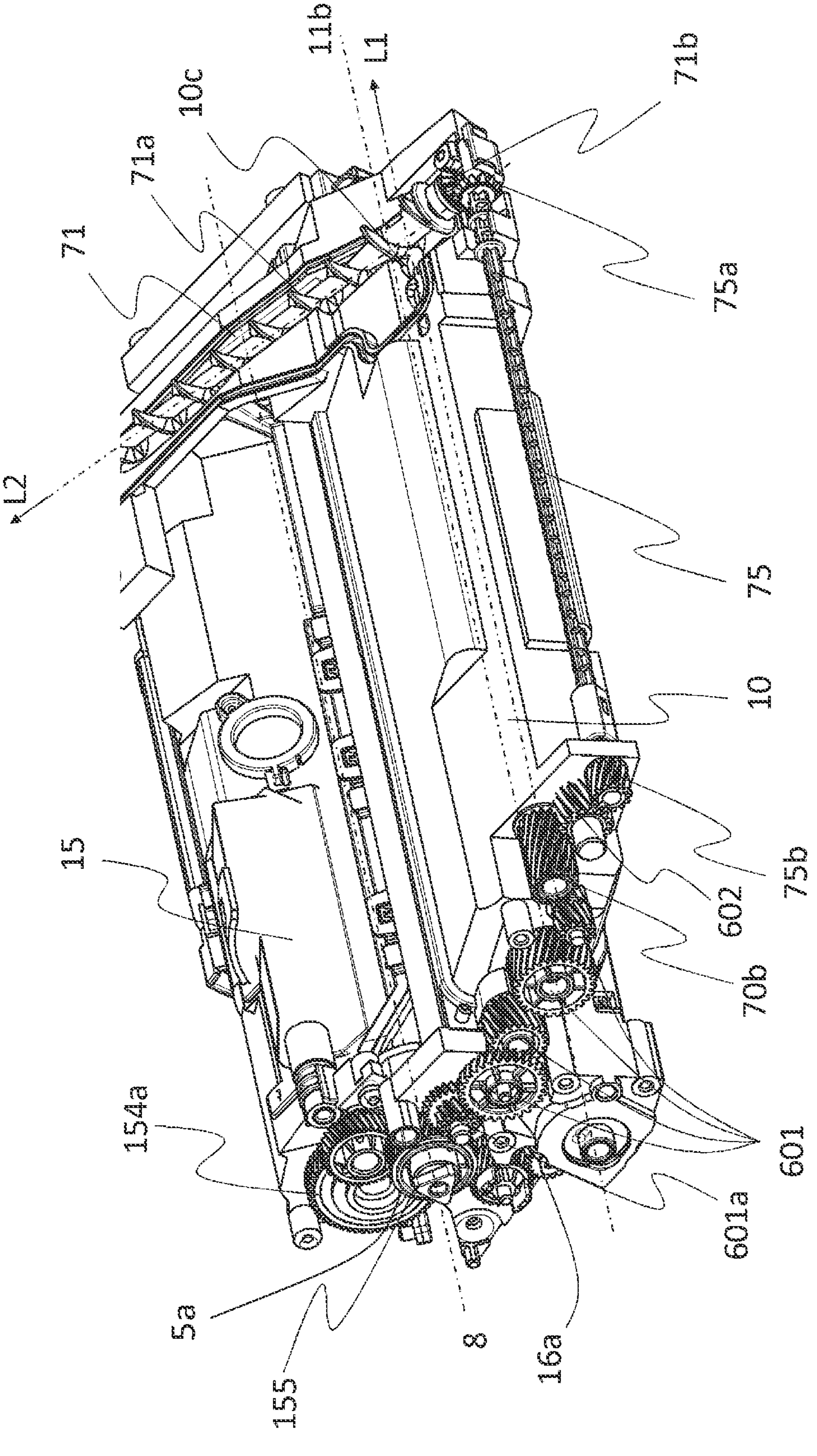
FIG. 27 is a schematic perspective view of the drive row of the process cartridge.

As shown in FIG. 27, in the development unit 15, the development coupling 155 as a drive input member for receiving the drive from the printer main body P is provided. The development coupling 155 is disposed substantially coaxially with the gear member 5*a* provided on the bearing member 5 (FIGS. 10A and 10B) and is disposed substantially coaxially with the swing axis 8. The gear member 5*a* is rotated with the rotation of the development coupling 155. That is, when seen from a direction of the swing axis 8, each member is disposed so that the rotation axis of the development coupling 155, a rotation center of the gear member 5*a*, and the swing axis 8 overlap. The development coupling 155 transmits a rotary force to a development roller gear 16*a* for transmitting the rotary force to the development roller 16, a stirring gear 154*a* for transmitting the rotary force to the stirring member 154 and the like.

Figure 26:
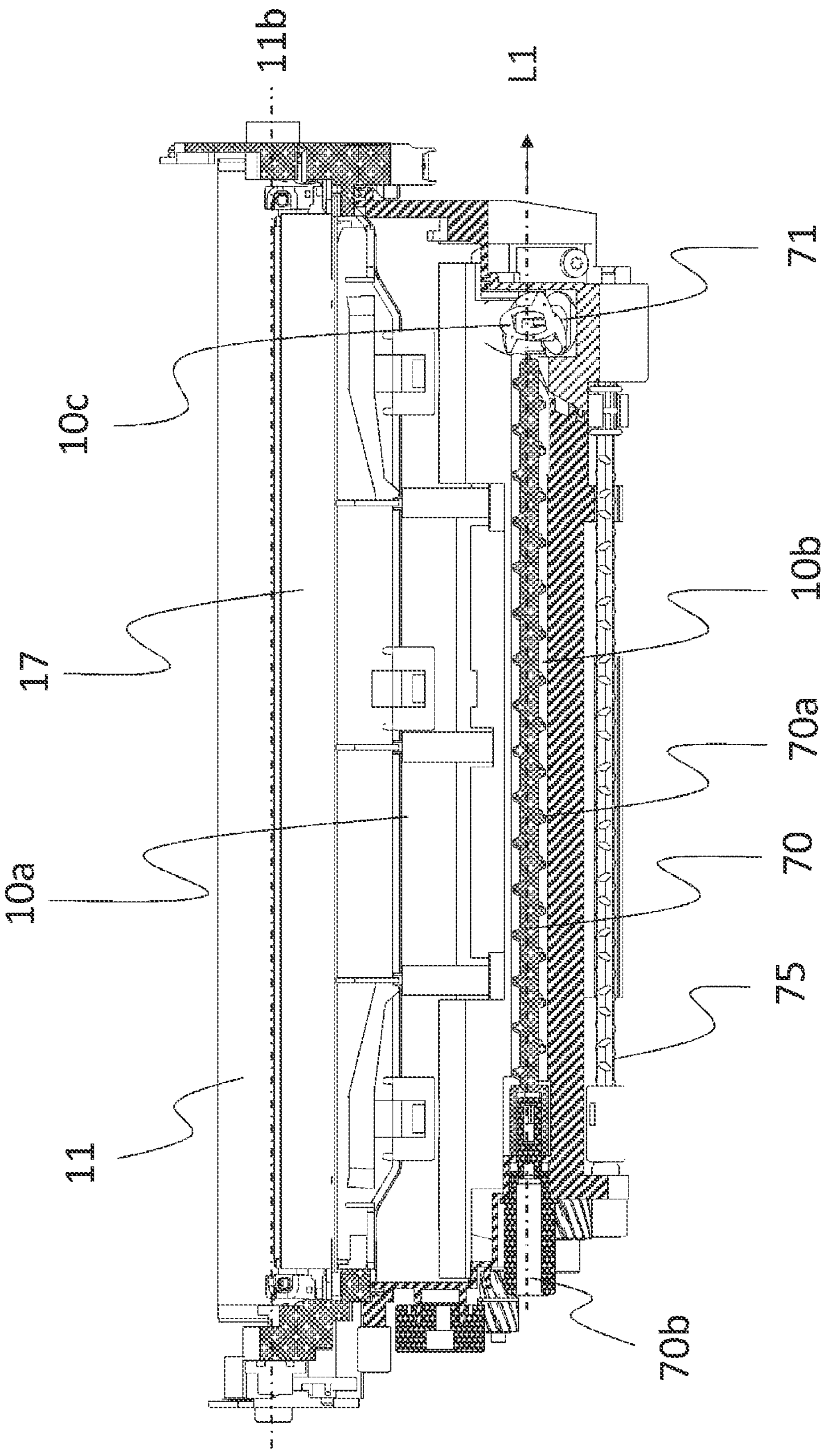
FIG. 26 is a schematic sectional view when the cleaning unit is seen from the upper surface.

Moreover, the development coupling 155 is connected to a first idler gear 601*a* disposed on an upstream side in a rotating direction of the gear train 601 as a rotary-force transmitting member provided in the cleaning unit 10 by the gear member 5*a* Furthermore, the first gear 70*b* for transmitting the rotary force to the first conveyance member 70 is disposed coaxially with the first conveyance member 70, and the first conveyance member 70 and the first gear 70*b* are integrally and rotatably connected (FIG. 26). Then, the gear train 601 is connected to the first gear 70*b*, and the rotary force is transmitted from the gear train 601 to the first gear 70*b*.

As described above, the development unit 15 is configured to move between the contact position and the separation position by rotating around the swing axis 8, which is substantially coaxial with the rotation axis of the development coupling 155, with respect to the cleaning unit 10. Thus, when the development unit 15 moves between the contact position and the separation position with respect to the photosensitive drum 11, a position change of the development coupling 155 can be kept very small of approximately fitting backlash.

Specifically, the gear member 5*a* is engaged with the hole shape 7*a* of the side cover 7 (FIG. 19A), while the gear member 5*a* of the bearing member 5 and the hole shape 7*a* of the side cover 7 are engaged with each other within the fitting backlash of 0.13 mm. Thus, the position of the development coupling 155 when the development unit 15 moves between the contact position and the separation position does not change more than a portion of the fitting backlash, and the position of the development coupling 155 is rarely changed as show % n in FIGS. 10A and 10B. Therefore, by having the configuration in which the drive force is transmitted from the development coupling 155 to the cleaning unit 10 through the gear member 5*a* and the gear train 601, the following effects can be obtained. That is, meshing of gear pairs across units from the development unit 15 to the cleaning unit 10 can be made stable. In other words, the meshed state of the development coupling 155 provided in the development unit 15 and the first idler gear 601*a* provided in the cleaning unit 10 can be maintained. As a result, during movement between the contact position and the separation position, occurrence of damage on the development coupling 155 and the first idler gear 601*a* connected to the development coupling 155 can be reduced.

As described above, in the configuration of this Embodiment, the drive force is transmitted from the development coupling 155 as the drive input member to the member provided in the cleaning unit 10 through the gear member 5*a* and the gear train 601. The gear member 5*a* is provided in the development unit 15, which is the second unit, and is rotated coaxially with the rotation axis of the development coupling 155 and coaxially also with the swing axis 8. And the first gear 70*b* for rotating the first conveyance member 70 and the gear train 601 for transmitting the driver force to the first gear 70*b* are provided in the cleaning unit 10 as the second unit. By means of this configuration, even if the development unit 15 moves between the contact position and the separation position, the meshing between the gears can be maintained without disconnection of the drive transmission path to the first gear 70*b*. As in the configuration of this Embodiment, in order to maintain the meshing between the gears regardless of the swing operation of the development unit 15, it is preferable that gears other than the inner gear member 5*a*, which is a gear for transmitting the drive to the first gear 70*b*, are all provided on the cleaning unit 10 side.

In addition, this configuration is not a configuration of transmitting the rotary force from a drum gear 11*a*1 provided in the photosensitive drum 11 to the first gear 70*b* as the cleaning unit 10. Thus, since it is configured such that a load variation or swing during rotation of the first conveyance member 70 is hardly transmitted to the photosensitive drum 11, the photosensitive drum 11 can be rotated stably.

Note that, in this Embodiment, the configuration in which the rotary force is transmitted from the development coupling 155 to the first gear 70*b* through the gear train 601 was explained, but this is not limiting. For example, such a configuration that the first gear 70*b* is connected to the development coupling 155 not through the gear train 601 can be suitably applied to the present invention.

Moreover, in this Embodiment, the configuration of transmitting the rotary force from the development coupling 155 to the first conveyance member 70 as the rotating member provided in the cleaning unit 10 was explained, but this is not limiting. For example, such a configuration that a rotating member other than the photosensitive drum 11 provided in the cleaning unit 10 such as the charging roller 12 is rotated can be suitably applied to the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-102192, filed on Jun. 24, 2022, and, Japanese Patent Application No. 2023-054270, filed on Mar. 29, 2023, which are hereby incorporated by reference wherein in their entirety.

What is claimed is:

1. A process unit comprising:

a rotatable photosensitive drum configured to bear a developer;

a development unit including a developer accommodating chamber configured to accommodate the developer supplied from a developer supply portion provided in a developer cartridge and a development roller configured to develop an electrostatic image formed on the photosensitive drum with the developer supplied from the developer accommodating chamber;

a transfer roller configured to transfer a toner image developed on the photosensitive drum to a sheet;

a cleaning member configured to remove the developer remaining on a surface of the photosensitive drum, the cleaning member including a contact portion in contact with a surface of the photosensitive drum and a support portion configured to support the contact portion;

a developer recovering portion configured to recover the developer removed by the cleaning member;

a first developer conveyance path;

a second developer conveyance path;

a first conveyance member disposed in the first developer conveyance path and configured to convey the recovered developer in a rotation axis direction of the photosensitive drum from the developer recovering portion to the second developer conveyance path;

a second conveyance member disposed in the second developer conveyance path and configured to convey the recovered developer in a direction crossing the rotation axis direction to a discharge port in the second developer conveyance path through which the developer is conveyed to a waste-developer recovering portion provided in the developer cartridge; and a third conveyance member configured to convey the recovered developer toward a center of the photosensitive drum in the rotation axis direction, wherein, in a state that the process unit is attached to an apparatus main body of an image forming apparatus, in a section perpendicular to the axis of rotation of the photosensitive drum, (i) the transfer roller is located below the photosensitive drum, (ii) the second conveyance member is above the photosensitive drum, (iii) the second conveyance member conveys the recovered developer upward relative to a gravity direction, and (iv) the recovered developer is discharged from the discharge port to the waste-developer recovering portion, wherein in the rotation axis direction, the second conveyance member is disposed in an inner side of the contact portion of the cleaning member with respect to an end part of the contact portion of the cleaning member, and wherein the developer recovered by the cleaning member is conveyed by the third conveyance member and is then conveyed by the first conveyance member.

2. The process unit according to claim 1, wherein each of the first conveyance member and the second conveyance member has a spiral portion configured to convey the developer.

3. The process unit according to claim 2, wherein a pitch of the spiral portion of the second conveyance member is longer than a pitch of the spiral portion of the first conveyance member.

4. The process unit according to claim 2, wherein a diameter of the spiral portion of the second conveyance member is larger than a diameter of the spiral portion of the first conveyance member.

5. The process unit according to claim 1, wherein the third conveyance member has a sheet member configured to convey the developer to the first conveyance member.

* * * * *